(12) United States Patent
Kamihira

(10) Patent No.: US 12,146,249 B2
(45) Date of Patent: Nov. 19, 2024

(54) SEWING ERROR MANAGEMENT DEVICE, SEWING ERROR MANAGEMENT SYSTEM, AND NON-TRANSITORY COMPUTER-READABLE STORAGE MEDIUM STORING SEWING ERROR MANAGEMENT PROGRAM

(71) Applicant: BROTHER KOGYO KABUSHIKI KAISHA, Nagoya (JP)

(72) Inventor: Yuta Kamihira, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 285 days.

(21) Appl. No.: 17/693,480

(22) Filed: Mar. 14, 2022

(65) Prior Publication Data

US 2022/0307179 A1 Sep. 29, 2022

(30) Foreign Application Priority Data

Mar. 26, 2021 (JP) ................. 2021-053013

(51) Int. Cl.
*D05B 19/02* (2006.01)
*G01N 21/88* (2006.01)
*G01N 21/95* (2006.01)

(52) U.S. Cl.
CPC ......... *D05B 19/02* (2013.01); *G01N 21/8803* (2013.01); *G01N 21/95* (2013.01); *D05D 2205/18* (2013.01)

(58) Field of Classification Search
CPC .... D05B 19/02; G01N 21/8803; G01N 21/95; D05D 2205/18; D05D 2205/12; D05C 13/02
See application file for complete search history.

(56) References Cited

U.S. PATENT DOCUMENTS 4,416,208 A * 11/1983 Nufer .................. D05B 19/02
112/470.05
5,078,067 A * 1/1992 Nakashima ........... D05B 51/00
112/447

(Continued)

FOREIGN PATENT DOCUMENTS

CN 105447847 A * 3/2016 ............. D05B 19/12
CN 113235230 A * 8/2021 ............. D05B 19/02

(Continued)

OTHER PUBLICATIONS

Geller et al.; "Accurate Stitch Position Identification of Sewn Threads in Textiles"; 25th IEEE International Conference on Emerging Geller Technologies and Factory Automation (ETFA) (vol. 1, 2020, pp. 505-512) (Year: 2020).*

(Continued)

*Primary Examiner* — Mohamed K Amara
(74) *Attorney, Agent, or Firm* — Oliff PLC

(57) ABSTRACT

A sewing error management device includes a display portion, a processor, and a memory. The memory is configured to store computer-readable instructions that, when executed by the processor, instruct the processor to acquire an error image obtained by drawing an occurrence position of an error on a sewing pattern. The acquiring the error image is based on coordinates representing a formation position of a sewing stitch being sewn at a time point when the error occurs in sewing of the sewing pattern formed by a plurality of sewing stitches. The acquiring the error image is also based on an image showing a shape of the sewing pattern. And the computer-readable instructions further instruct the processor to display the acquired error image on the display portion.

13 Claims, 19 Drawing Sheets

(56) References Cited

U.S. PATENT DOCUMENTS

| | | | |
|---|---|---|---|
| 5,228,403 A * | 7/1993 | Sugimoto | D05B 19/10 112/273 |
| 5,333,560 A | 8/1994 | Yoshida | |
| 5,359,949 A | 11/1994 | Asano | |
| 5,794,552 A * | 8/1998 | Owaki | D05B 19/105 112/102.5 |
| 5,996,518 A * | 12/1999 | Tomita | D05B 19/105 112/102.5 |
| 8,763,542 B2 * | 7/2014 | Abe | D05B 19/04 112/102.5 |
| 9,834,876 B2 * | 12/2017 | Kongo | D05B 19/02 |
| 2002/0040258 A1 | 4/2002 | Asano | |
| 2014/0085456 A1 * | 3/2014 | Gylling | H04N 7/18 348/88 |
| 2018/0230633 A1 | 8/2018 | Kongo | |
| 2019/0376216 A1 * | 12/2019 | Blenis, Jr. | D05B 19/16 |
| 2020/0010991 A1 * | 1/2020 | Minematsu | D05B 19/10 |

FOREIGN PATENT DOCUMENTS

| | | |
|---|---|---|
| JP | H04-156888 A | 5/1992 |
| JP | H04-161191 A | 6/1992 |
| JP | H5-293266 A | 11/1993 |
| JP | H6-142382 A | 5/1994 |
| JP | H8-224389 A | 9/1996 |
| JP | H11-104371 A | 4/1999 |
| JP | 2000-288274 A | 10/2000 |
| JP | 2001-087580 A | 4/2001 |
| JP | 2002-102560 A | 4/2002 |
| JP | 2002-143584 A | 5/2002 |
| JP | 2005-261467 A | 9/2005 |
| JP | 2018-130272 A | 8/2018 |

OTHER PUBLICATIONS

Jul. 23, 2024 Office Action issued in Japanese Patent Application No. 2021-053013.

* cited by examiner

FIG. 4

| spm | ERROR RANGE | |
|---|---|---|
| 350 | 6 STITCHES EITHER SIDE OF ERROR STITCH NUMBER (REFERENCE) | ~400 |
| 400 | 7 STITCHES EITHER SIDE OF ERROR STITCH NUMBER (REFERENCE) | |
| 500 | 9 STITCHES EITHER SIDE OF ERROR STITCH NUMBER (REFERENCE) | |
| 600 | 10 STITCHES EITHER SIDE OF ERROR STITCH NUMBER (REFERENCE) | |
| 700 | 12 STITCHES EITHER SIDE OF ERROR STITCH NUMBER (REFERENCE) | |
| 800 | 14 STITCHES EITHER SIDE OF ERROR STITCH NUMBER (REFERENCE) | |
| 900 | 15 STITCHES EITHER SIDE OF ERROR STITCH NUMBER (REFERENCE) | |
| 1050 | 18 STITCHES EITHER SIDE OF ERROR STITCH NUMBER (REFERENCE) | |

FIG. 5

| ERROR TYPE | CORRECTION COEFFICIENT |
|---|---|
| UPPER THREAD BREAKAGE | 1.0 |
| LOWER THREAD BREAKAGE | 0.0 |
| THREAD ENTANGLEMENT | 0.7 |

| ERROR TYPE | COUNTERMEASURE |
|---|---|
| THREAD ENTANGLEMENT | PLEASE CHECK EMBROIDERY DATA THREAD DENSITY |
| UPPER THREAD BREAKAGE | PLEASE CHECK EMBROIDERY DATA THREAD DENSITY |
| UPPER THREAD BREAKAGE | PLEASE CHECK THAT UPPER THREAD IS CORRECTLY SET |
| LOWER THREAD BREAKAGE | PLEASE CHECK REMAINING AMOUNT OF LOWER THREAD |
| LOWER THREAD BREAKAGE | PLEASE CHECK PLACEMENT CONDITION OF LOWER THREAD BOBBIN |

~ 600

SEWING ERROR MANAGEMENT DEVICE, SEWING ERROR MANAGEMENT SYSTEM, AND NON-TRANSITORY COMPUTER-READABLE STORAGE MEDIUM STORING SEWING ERROR MANAGEMENT PROGRAM

CROSS-REFERENCE TO RELATED APPLICATION

This application claims priority to Japanese Patent Application No. 2021-053013, filed on Mar. 26, 2021, the content of which is hereby incorporated by reference.

BACKGROUND

The present disclosure relates to a sewing error management device, a sewing error management system, and a non-transitory computer-readable storage medium storing a sewing error management program, which display error information for an error, such as an upper thread breakage, that occurs in a sewing machine such as an embroidery sewing machine and the like.

In related art, various sewing machine information management devices are proposed. Those sewing machine information management devices store history information including sewing machine error information and cause a display device to display the stored history information. For example, a sewing machine management device of the related art reads, from an embroidery sewing machine, an operation status of the sewing machine. The sewing machine management device is provided with a storage unit that cumulatively stores the operation status as the history information, and a display unit that displays the history information. Error information is included in the history information, and the error information is configured by information indicating the occurrence of an error, such as thread breakage or the like, in association with a number of sewn stitches when the error occurs.

SUMMARY

In the sewing machine management device of the related art, an operator can easily verify the number of sewn stitches at the time the error occurs, by closely observing the displayed error information. However, in sewing of a sewing pattern formed by a very large number of stitches, such as an embroidery pattern, even if the operator verifies the number of sewn stitches at the time the error occurs, from the very large number of stitches of the sewing pattern that are actually sewn, it is not easy to discover the stitch corresponding to the number of sewn stitches when the error occurs. Thus, in the display, of the related art, of the number of sewn stitches when the error occurs, there is a problem in that, depending on the sewing pattern having the large number of stitches, a relatively long period of time is required for the operator to identify a position at which the error has occurred in the sewing pattern.

An object of the present disclosure is to solve the above-described problem, and to provide a sewing error management device, a sewing error management system, and a non-transitory computer-readable storage medium storing a sewing error management program with which an operator can easily verify an occurrence position of an error, in an image representing a shape of the sewing pattern to be sewn.

To achieve the above-described object, a sewing error management device according to the present disclosure includes a display portion, a processor, and a memory. The memory is configured to store computer-readable instructions that, when executed by the processor, instruct the processor to perform following processes. The processor acquires an error image obtained by drawing an occurrence position of an error on a sewing pattern, based on coordinates and an image. The coordinates represent a formation position of a sewing stitch being sewn at a time point when the error occurs in sewing of the sewing pattern formed by a plurality of sewing stitches. The image shows a shape of the sewing pattern. And the processor displays the acquired error image on the display portion.

According to the above-described sewing error management device, the occurrence position of the error that occurs in the sewing is displayed on the image showing the shape of the sewing pattern. Thus, an operator can easily verify the occurrence position of the error.

To achieve the above-described object, a sewing error management system according to the present disclosure includes a sewing machine and an external device. The sewing machine is configured to sew a sewing pattern in accordance with coordinates representing formation positions of each of sewing stitches of the sewing pattern formed by a plurality of the sewing stitches. The sewing machine includes a first processor and a first memory. The first memory is configured to store computer-readable instructions that, when executed by the first processor, instruct the first processor to perform following processes. The first processor acquires the coordinates representing the formation position of the sewing stitch being sewn at a time point when an error occurs in sewing of the sewing pattern. And the first processor generates an error image obtained by drawing an occurrence position of the error on the sewing pattern, based on an image showing a shape of the sewing pattern and on the acquired coordinates. The external device is configured to communicate with the sewing machine. The external device includes a display portion displaying the image, a second processor, and a second memory. The second memory is configured to store computer-readable instructions that, when executed by the second processor, instruct the second processor to perform following processes. The second processor acquires the generated error image, by the communication with the sewing machine. And the second processor displays the acquired error image on the display portion.

According to the above-described sewing error management system, as a result of the sewing machine and the external device communicating with each other, the operator can receive the error image using the external device that is close by, even when in a location separated from the sewing machine, and can rapidly verify the occurrence position of the error.

To achieve the above-described object, a non-transitory computer-readable storage medium storing a sewing error management program for displaying error information relating to an error occurring in sewing of a sewing pattern formed from a plurality of sewing stitches according to the present disclosure includes computer-readable instructions that, when executed by a processor provided in a sewing error management device, instruct the processor to perform following processes. The processor acquires an error image obtained by drawing an occurrence position of the error on the sewing pattern, based on coordinates and an image. The coordinates represent a formation position of the sewing stitch being sewn at a time point when the error occurs in the sewing of the sewing pattern. The image shows a shape of the sewing pattern. And the processor displays the acquired error image on a display portion of the sewing error management device.

According to the above-described non-transitory computer-readable storage medium storing the sewing error management program, the occurrence position of the error that occurs in the sewing is displayed on the image showing the shape of the sewing pattern. Thus, the operator can easily verify the occurrence position of the error.

BRIEF DESCRIPTION OF THE DRAWINGS

Embodiments of the disclosure will be described below in detail with reference to the accompanying drawings in which:

FIG. 4 is an explanatory diagram showing an error range table 400 stored in a table storage portion 72;

FIG. 5 is an explanatory diagram showing a correction coefficient table 500 stored in the table storage portion 72;

FIG. 6 is an explanatory diagram showing a countermeasure table 600 stored in a table storage portion 121;

DETAILED DESCRIPTION

An embodiment of the present disclosure will be described with reference to the drawings. Note that the drawings are used to illustrate the technical features that can be adopted in the present disclosure, and the described configurations and the like of the devices are merely explanatory examples.

Embodiment

Figure 1:
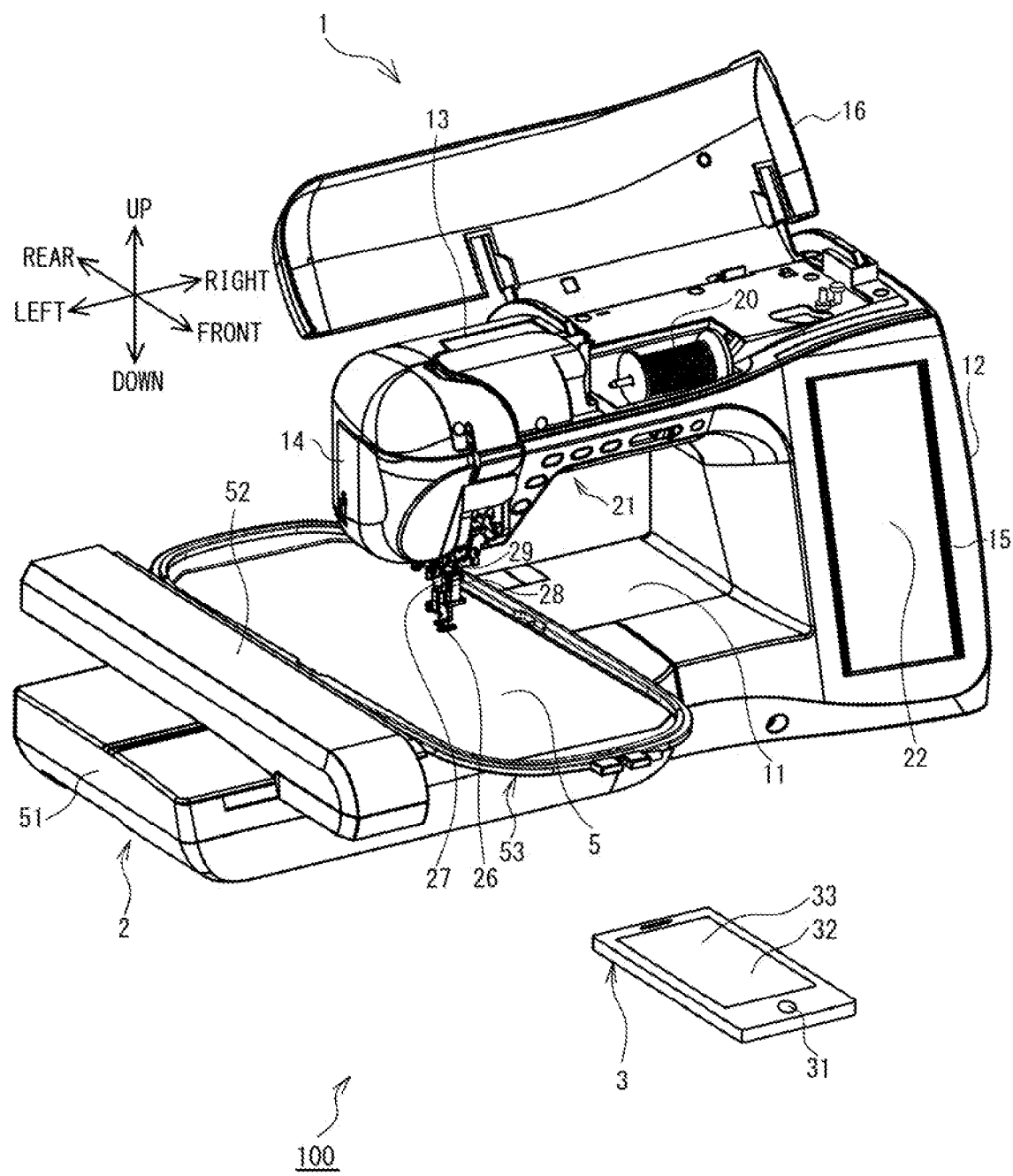
FIG. 1 is a perspective view of a sewing error management system 100 provided with a sewing machine 1 and a mobile terminal 3 as an embodiment.

A sewing error management system 100 that is an embodiment, will be explained with reference to FIG. 1 and FIG. 2. As shown in FIG. 1, the sewing error management system 100 is mainly provided with a sewing machine 1 and a mobile terminal 3. A network 9 shown in FIG. 3 is connected to the sewing machine 1 and the mobile terminal 3, respectively. Hereinafter, directions used in the explanation are based on directions described in FIG. 1.

Basic Configuration of Sewing Machine 1

The sewing machine 1 is provided with functions to sew an embroidery pattern as a sewing pattern. As shown in FIG. 1, the sewing machine 1 is provided with a bed portion 11, a pillar 12, and an arm portion 13. The bed portion 11 is a base of the sewing machine 1, and extends in the left-right direction. The pillar 12 extends upward from the right end portion of the bed portion 11. The arm portion 13 extends to the left from the upper end of the pillar 12, so as to face the bed portion 11. A head portion 14 is provided on the left end portion of the arm portion 13.

A known embroidery device 2 is detachably mounted to the bed portion 11. When the embroidery device 2 is mounted to the sewing machine 1, the embroidery device 2 and the sewing machine 1 are electrically connected. When the embroidery device 2 and the sewing machine 1 are electrically connected, the embroidery device 2 can convey a sewing object 5 held by an embroidery frame 53. The embroidery device 2 is provided with a main body portion 51 and a carriage 52.

A display 15 is provided on a front surface of the pillar 12. The display 15 is an liquid crystal display. The display 15 displays an image including various items, such as commands, illustrations, setting values, messages, and the like. A touch panel 22 is provided on a front surface side of the display 15, and is configured to be able to detect a pressed position. When an operator performs a pressing operation of the touch panel 22 using a finger or a dedicated touch pen, the touch panel 22 detects the pressed position. On the basis of the detected pressed position, the touch panel 22 recognizes which item is selected on the image displayed on the display 15.

A cover 16 that can be opened and closed is provided on an upper portion of the arm portion 13. FIG. 1 shows a state in which the cover 16 is open. A thread spool 20 is housed below the cover 16, that is, in the interior and the center portion of the arm portion 13. An upper thread (not shown in the drawings) that is wound on the thread spool 20 is supplied to a sewing needle 28 mounted to a needle bar 29, from the thread spool 20 via a threading portion (not shown in the drawings) provided in the head portion 14. A plurality of operating switches 21, including a start/stop switch, are provided on a lower portion of the front surface of the arm portion 13.

A presser mechanism (not shown in the drawings), a needle bar up-down drive mechanism (not shown in the drawings), and the like are provided inside the head portion 14. The presser mechanism drives a presser bar 27, using a presser motor as a power supply. The needle bar up-down drive mechanism drives the needle bar 29 in the up-down direction in concert with the rotation of a drive shaft (not shown in the drawings). The needle bar up-down drive mechanism is driven by a drive shaft motor 88. The needle bar 29 and the presser bar 27 extend downward from the lower end portion of the head portion 14. The sewing needle 28 is detachably mounted to the lower end of the needle bar 29. A presser foot 26 is detachably mounted to the lower end of the presser bar 27. The presser foot 26 can press the sewing object 5 from above while allowing the sewing object 5 to be conveyed.

Explanation of Sewing Pattern 200

Sewing information will be explained using the sewing pattern 200 shown in FIG. 2 as an example. Note that the left-right direction and the up-down direction on paper in FIG. 2 respectively correspond to an X direction and a Y direction in a coordinate system.

Figure 2:
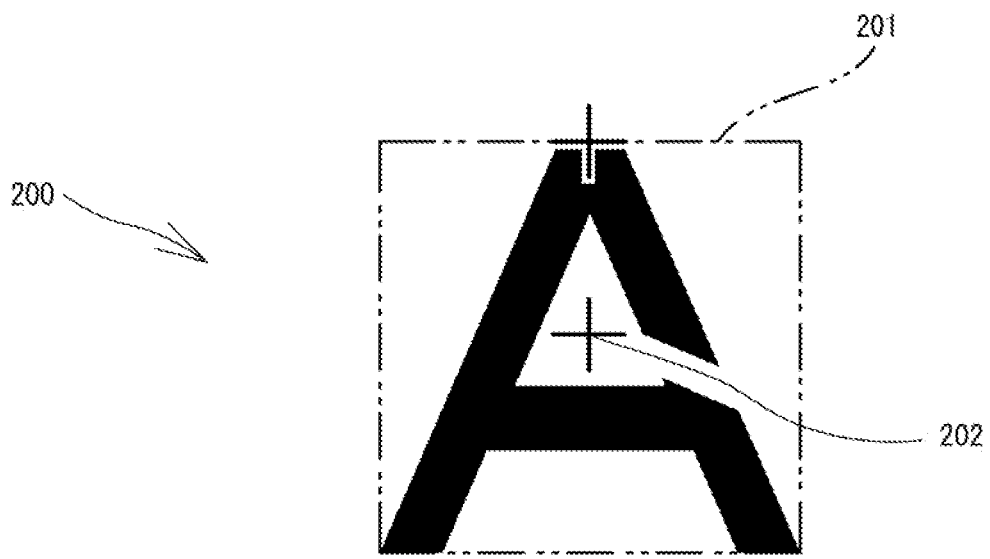
FIG. 2 is an explanatory diagram of a sewing pattern 200.
Figure 3:
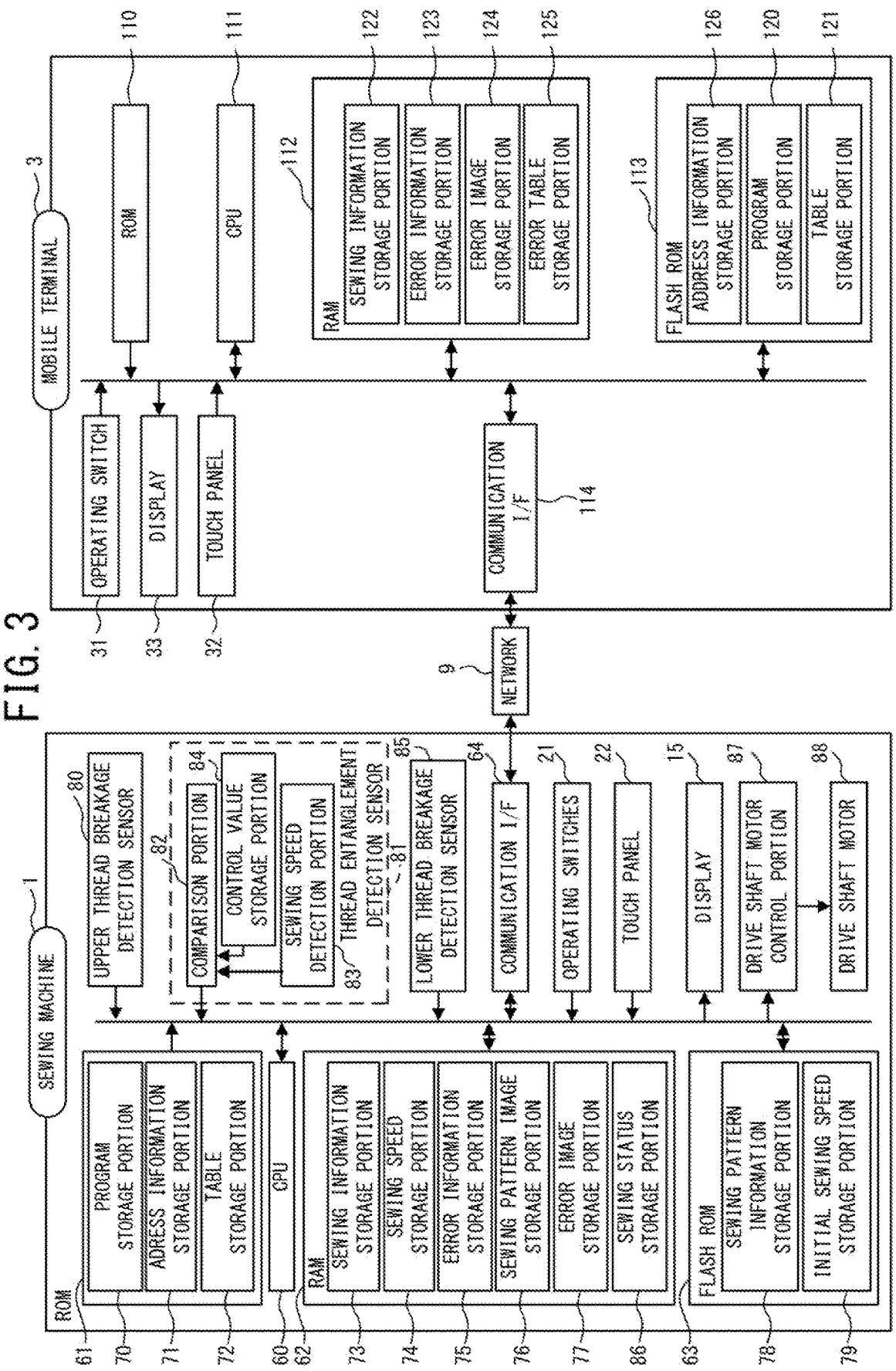
FIG. 3 is a block diagram showing an electrical configuration of the sewing error management system 100.

The sewing pattern 200 shown in FIG. 2 is a pattern representing the capital letter "A" of the alphabet. The sewing information is information for forming sewing stitches for sewing the sewing pattern 200. The sewing information includes an absolute total stitch number, a thread color, an absolute stitch number per thread color, and sewing stitch coordinates. For the stitch number indicating a number in a sewing stitch formation order for sewing the sewing pattern, the absolute total stitch number represents a total quantity of the number of stitches required to complete the sewing pattern. The thread color represents the color of the thread used in the sewing, and is set using three RGB values for each of the stitch numbers. The absolute stitch number per thread color represents a total quantity of the number of stitches divided into each of the thread colors. The sewing stitch coordinates are set for each of the stitch numbers, and indicate a position at which the sewing stitch is formed, that is, the position of a stitch where the sewing needle 28 pierces the sewing object 5. Further, the sewing stitch coordinates are represented using the coordinate system as a reference, and are prescribed such that a center point 202 of a minimum rectangle 201 encompassing the sewing pattern 200 is aligned with the origin point of the coordinate system. For example, in a case of the sewing pattern that is sewn using threads in which 15 stitches of the stitch numbers 1 to 15 are red, 15 stitches of the stitch numbers 16 to 30 are blue, and 15 stitches of the stitch numbers 31 to 45 are black, the absolute total stitch number is 45 stitches. In the case of this example, the thread color of the stitch of the stitch number 17 is blue, and the sewing stitch coordinates are (130, 140). The absolute stitch number per thread color is 15 stitches for all of the red, blue and black colors. An operation to change the thread color during the sewing is a known operation. For example, at a timing of changing to the thread of a next color, the drive shaft motor 88 is automatically stopped by a CPU 60. While the drive shaft motor 88 is stopped, the operator replaces the thread with the thread of the color to be used next for the sewing, and the sewing is restarted using the replacement color, by pressing the start/stop switch of the operating switches 21.

Basic Configuration of Mobile Terminal 3

As shown in FIG. 1, the mobile terminal 3 is a known multi-function mobile phone (a so-called smartphone). An operating switch 31, a touch panel 32, and a display 33 are provided on the upper surface of the mobile terminal 3. The operating switch 31 is used when inputting various commands to the mobile terminal 3. The display 33 is a liquid crystal display. The display 33 displays an image including various items, such as commands, illustrations, setting values, messages, and the like. The touch panel 32 is provided on a front surface side of the display 33, and can detect a pressed position. When the operator performs a pressing operation of the touch panel 32 using a finger or a dedicated touch pen, the touch panel 32 detects the pressed position. On the basis of the detected pressed position, the touch panel 32 recognizes which item is selected on the image.

The mobile terminal 3 can install a desired application program from a server (not shown in the drawings), via a known communication network, such as the Internet. In the embodiment, the mobile terminal 3 can install an application program that acquires desired information from the sewing machine 1 and displays the information on the display 33, such as a program of display processing shown in flowcharts in FIG. 11 and FIG. 12, for example. When the application program is installed, attached information is also installed. In the embodiment, the mobile terminal 3 installs, as the attached information, a countermeasure table 600 (refer to FIG. 6) relating to errors that can occur in the sewing machine 1.

Electrical Configuration of Sewing Machine 1

The electrical configuration of the sewing machine 1 will be explained with reference to FIG. 3. The sewing machine 1 is provided with the CPU 60, a ROM 61, a RAM 62, a flash ROM 63, and a communication I/F 64 as a control portion configured by a computer. The CPU 60, the ROM 61, the RAM 62, the flash ROM 63, and the communication I/F 64 are electrically connected to each other. The ROM 61 stores a boot program, a BIOS, and the like, and is provided with a program storage portion 70, an address information storage portion 71, and a table storage portion 72. The address information storage portion 71 stores addresses that are identification numbers different for each of individual sewing machines. The table storage portion 72 stores an error range table 400 (refer to FIG. 4) and a correction coefficient table 500 (refer to FIG. 5) to be described later, and the like. The RAM 62 is provided with a sewing information storage portion 73, a sewing speed storage portion 74, an error information storage portion 75, a sewing pattern image storage portion 76, an error image storage portion 77, and a sewing status storage portion 86. The flash ROM 63 stores a program for the CPU 60 to perform various processing, and is provided with a sewing pattern information storage portion 78 and an initial sewing speed storage portion 79. The sewing pattern information storage portion 78 stores the sewing information necessary for forming a sewing pattern image, for a plurality of sewing patterns. The sewing information storage portion 73 stores the sewing information read out from the sewing pattern information storage portion 78, for the sewing pattern selected by the operator. The sewing status storage portion 86 stores the stitch number of the sewing stitch currently being sewn by the sewing machine 1, the coordinates of the sewing stitch corresponding to the stitch number of the sewing stitch currently being sewn by the sewing machine 1, and the thread color used for the sewing stitch currently being sewn by the sewing machine 1. The communication I/F 64 is an interface for connecting the sewing machine 1 to the network 9.

In addition, the operating switches 21, the touch panel 22, the display 15, an upper thread breakage detection sensor 80, a thread entanglement detection sensor 81, and a lower thread breakage detection sensor 85 are electrically connected to the sewing machine control portion. A drive shaft motor control portion 87 that controls the driving of the drive shaft motor 88 is also electrically connected to the sewing machine control portion. The upper thread breakage detection sensor 80, the thread entanglement detection sensor 81, and the lower thread breakage detection sensor 85 respectively detect a sewing error of an upper thread breakage, a thread entanglement and a lower thread breakage.

Detailed Configuration for Detecting Sewing Error

In the embodiment, in order to detect the sewing error, the sewing machine 1 is equipped with the upper thread breakage detection sensor 80, the thread entanglement detection sensor 81, and the lower thread breakage detection sensor 85.

The upper thread breakage detection sensor 80 has a known configuration. Specifically, the upper thread breakage detection sensor 80 is configured by a sensor, such as an optical sensor or the like, disposed inside a thread tension mechanism that adjusts the tension of the upper thread, and detects the movement of a shutter that is displaced in accordance with the tension of the upper thread. The upper thread breakage detection sensor 80 transmits an upper thread breakage detection signal to the CPU 60 when a state is detected in which there is no tension in the upper thread.

The thread entanglement detection sensor 81 has a known configuration that detects the occurrence of thread entanglement, in concert with the drive shaft motor 88 being locked by an excessive load during sewing. Specifically, the thread entanglement detection sensor 81 is provided with a comparison portion 82, a sewing speed detection portion 83, and a control value storage portion 84. The sewing speed detection portion 83 detects a rotation speed of the drive shaft motor 88, as the sewing speed. The control value storage portion 84 stores, in advance, a control value corresponding to the sewing speed when the drive shaft motor 88 is in an excessive load state. The comparison portion 82 compares the detected sewing speed with the control value and transmits a thread entanglement detection signal to the CPU 60 when the comparison portion 82 determines that the detected sewing speed is lower than the control value.

The lower thread breakage detection sensor 85 has a known configuration. Specifically, the lower thread breakage detection sensor 85 is configured by a sensor, such as an electromagnetic sensor or the like that detects the movement of a piece for detection that is displaced in accordance with the tension of the lower thread red out from a lower thread bobbin inside a shuttle. The lower thread breakage detection sensor 85 transmits a lower thread breakage detection signal to the CPU 60 when a state is detected in which tension is not applied to the lower thread and the piece for detection is not displaced.

Error Range Table 400

The error range table 400 shown in FIG. 4 is stored in the table storage portion 72. The error range table 400 is a table that associates the sewing speed and an error range with each other. The sewing speed is indicated in units of spm, using a value representing a number of the sewing stitches to be sewn in one minute, namely, the number of the stitches. The error range is a range indicating, when an error stitch number is taken as a reference, how many stitches on either side are impacted by the error. The error stitch number represents the stich number of the sewing stitch that is being sewn by the sewing machine 1 at the time at which the error occurs. In the embodiment, the time at which the error occurs specifies a time at which the CPU 60 receives the detection signal from the upper thread breakage detection sensor 80, the thread entanglement detection sensor 81, and the lower thread breakage detection sensor 85. For example, when the sewing speed is set to 600 spm, when the error occurs, based on the error range table 400, the error range is decided to be a range of 10 stitches on either side of the error stitch number that is the reference.

Correction Coefficient Table 500

The correction coefficient table 500 shown in FIG. 5 is stored in the table storage portion 72. The correction coefficient table 500 is a table that associates an error type and a correction coefficient with each other. The error type represents a cause of the error that has occurred, and in the embodiment, indicates the upper thread breakage, the thread entanglement, and the lower thread breakage. The error range changes depending on the error type. For example, when the error type is the thread entanglement, the drive shaft motor 88 is locked, and thus, compared to the upper thread breakage, the error range is narrower. Further, in the case of the lower thread breakage, this is generally likely to be caused by the thread running out. Thus, since there is no impact on the sewing pattern even when the sewing is continued in the state of no thread, in the case of the lower thread breakage, the error range is indicated by the formation position of the single sewing stitch. The correction coefficient is a numerical value set to be different depending on the error type, and is used in correcting the error range.

Electrical Configuration of Mobile Terminal 3

The electrical configuration of the mobile terminal 3 will be explained with reference to FIG. 3. The mobile terminal 3 is provided with a CPU 111, a ROM 110, a RAM 112, a flash ROM 113, and a communication I/F 114 as a terminal control portion configured by a computer. The CPU 111 controls the mobile terminal 3. The CPU 111, the ROM 110, the RAM 112, the flash ROM 113, and the communication I/F 114 are electrically connected to each other. The ROM 110 stores a boot program, a BIOS, and the like. The RAM 112 is provided with a sewing information storage portion 122, an error information storage portion 123, an error image storage portion 124, and an error table storage portion 125. The flash ROM 113 is provided with an address information storage portion 126, a program storage portion 120, and a table storage portion 121. The address information storage portion 126 in the flash ROM 113 stores the address of the sewing machine 1. The program storage portion 120 and the table storage portion 121 respectively store the installed display processing program and the countermeasure table 600 (refer to FIG. 6). The countermeasure table 600 (refer to FIG. 6) will be described later. The communication I/F 114 is an interface for connecting the mobile terminal 3 to the network 9.

The mobile terminal control portion is electrically connected to the operating switch 31, the touch panel 32, and the display 33. The display 33 is used as a display unit to display an image based on image information, for example.

Countermeasure Table 600

As described above, the countermeasure table 600 shown in FIG. 6 is installed in the mobile terminal 3 along with the display processing program, and is stored in the table storage portion 121. The countermeasure table 600 is a table associating the error types and countermeasures with each other. The countermeasure indicates a countermeasure to be adopted for the operator to solve the error, with respect to each of the error types.

Operations of Sewing Error Management System 100 According to Embodiment

A series of operations of the sewing error management system 100 will be explained with reference to the flowcharts shown in FIG. 7 to FIG. 12.

Main Processing of Sewing Machine 1

Figure 7:
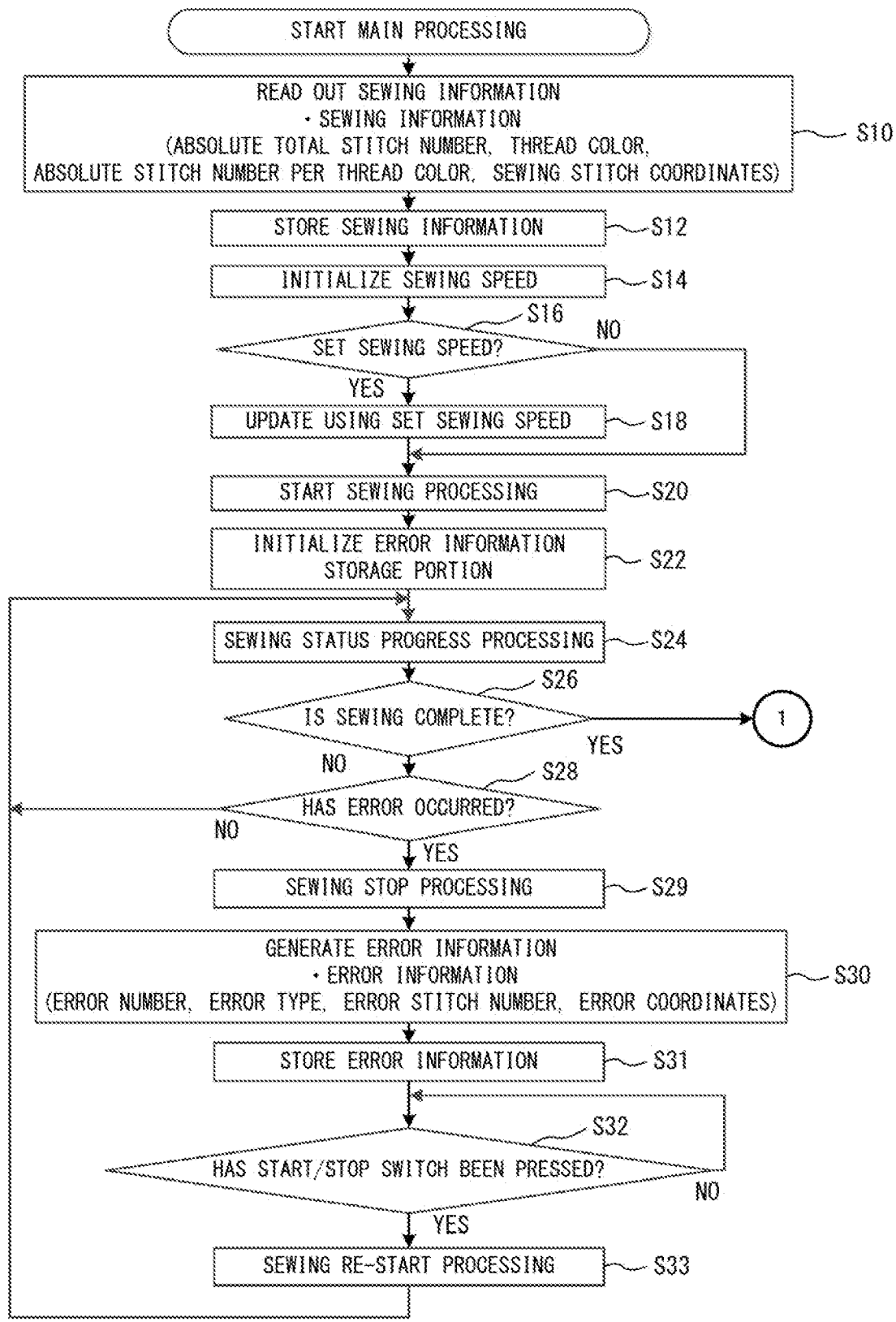
FIG. 7 is a flowchart (1/2) of main processing performed by the sewing machine 1.
Figure 8:
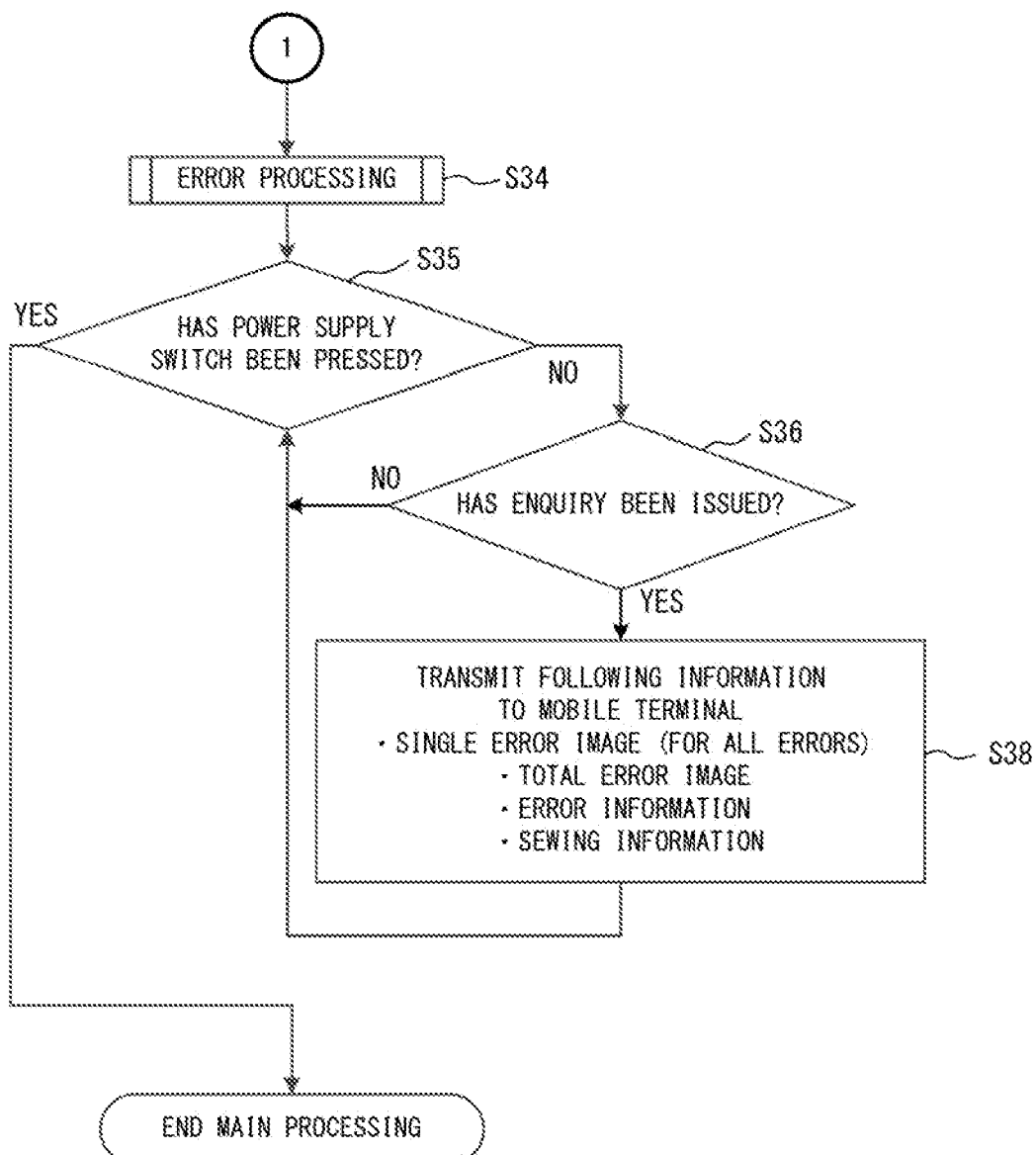
FIG. 8 is a flowchart (2/2) of the main processing performed by the sewing machine 1.

Operations of the main processing performed by the sewing machine 1 will be explained in accordance with the flowcharts shown in FIG. 7 and FIG. 8. The main processing is started by the CPU 60 performing the program stored in the program storage portion 70 as a result of the operator pressing a power supply switch, of the operating switches 21 of the sewing machine 1. Each processing step of the series of processing shown by step S10 to step S38 in FIG. 7 and FIG. 8 is performed by the CPU 60 of the sewing machine 1.

The operator operates the touch panel 22 and selects a desired sewing pattern from among the sewing patterns displayed on the display 15. The CPU 60 reads the sewing information relating to the selected sewing pattern, from the sewing pattern information storage portion 78 of the flash ROM 63 (step S10). The sewing information includes the absolute total stitch number, the sewing stitch coordinates, the thread colors, and the absolute stitch number per thread color. The CPU 60 stores the sewing information read out from the sewing pattern information storage portion 78, in the sewing information storage portion 73 of the RAM 62 (step S12).

The CPU 60 initializes a value of the sewing speed stored in the sewing speed storage portion 74 of the RAM 62, using an initial sewing speed value stored in the initial sewing speed storage portion 79 of the flash ROM 63 (step S14). The initial sewing speed is the sewing speed of an initial state that is automatically set when the sewing machine 1 is activated. The operator can change the setting of the initial sewing speed, and from a next time onward, the initialization of the initial sewing speed is performed using the value of the initial sewing speed that has been changed.

The operator can change the sewing speed of the sewing machine 1 from the initial sewing speed, and perform the sewing. The CPU 60 determines whether or not to set the sewing speed (step S16). When the operator does not set the sewing speed (no at step S16), the CPU 60 advances the processing to step S20 with the sewing speed as the initial sewing speed without change. When the operator sets the sewing speed (yes at step S16), the CPU 60 updates the sewing speed storage portion 74 of the RAM 62 using the new sewing speed that has been set (step S18).

When the operator presses the start/stop switch, of the operating switches 21 of the sewing machine 1, the CPU 60 starts the sewing on the basis of the sewing information stored at step S12 and the information such as the sewing speed and the like updated at step S18 (step S20).

The CPU 60 initializes the error information storage portion 75 of the RAM 62 (step S22).

When the sewing is started, the CPU 60 performs sewing status progress processing (step S24). The sewing status progress processing is control processing that is performed each time the sewing machine 1 performs the sewing for one stitch, and includes processing to update the stitch number of the sewing stitch currently being sewn by the sewing machine 1, the coordinates of the sewing stitch currently being sewn by the sewing machine 1, and the thread color used for the sewing stitch currently being sewn by the sewing machine 1, which are to be stored in the sewing status storage portion 86 of the RAM 62.

The CPU 60 compares the updated stitch number of the sewing stitch currently being sewn by the sewing machine 1 with the absolute total stitch number, of the sewing information stored in the sewing information storage portion 73 of the RAM 62, and determines whether or not the sewing is complete (step S26). When the stitch number of the sewing stitch currently being sewn by the sewing machine 1 matches the absolute total stitch number, the CPU 60 determines that the sewing is complete (yes at step S26) and advances the processing to step S34 (refer to FIG. 8). When the stitch number of the sewing stitch currently being sewn by the sewing machine 1 does not match the absolute total stitch number, the CPU 60 determines that the sewing is still continuing (no at step S26), and advances the processing to step S28.

When the sewing is continuing, the CPU 60 determines whether or not the error has occurred during the sewing of the sewing pattern, such as the upper thread breakage, the thread entanglement, and the lower thread breakage (step S28). When the CPU 60 receives the detection signal notifying that the error has occurred and determines that the error has occurred (yes at step S28), the CPU 60 advances the processing to step S29. When the CPU 60 does not receive the detection signal and does not determine that the error has occurred (no at step S28), the CPU 60 returns the processing to step S24, and once more performs the sewing status progress processing (step S24).

When the error has occurred, the CPU 60 performs sewing stop processing (step S29). The CPU 60 transmits a signal, to the drive shaft motor control portion 87, to stop the drive shaft motor 88, in order to stop the sewing.

The CPU 60 generates error information (step S30). The error information includes an error number, the error type, the error stitch number, and error coordinates. The error number is a value that increases by 1 each time the error occurs, using a numerical value indicating which number is the error that has occurred this time, from the start of the sewing. The error type indicates the cause of the error, such as the thread breakage, and is decided in accordance with the detection signal received by the CPU 60. The error coordinates indicate the coordinates of the sewing stitch corresponding to the stitch number of the sewing stitch currently being sewn by the sewing machine 1 at the time at which the present error has occurred. The error coordinates are decided on the basis of the stitch number of the sewing stitch currently being sewn by the sewing machine 1 to be stored in the sewing status storage portion 86, and on the coordinates of the sewing stitch corresponding to the stitch number of the sewing stitch currently being sewn by the sewing machine 1.

The CPU 60 stores the error information generated at step S30 in the error information storage portion 75 of the RAM 62 (step S31). After storing the error information, the CPU 60 advances the processing to step S32.

The CPU 60 determines whether or not the start/stop switch has been pressed (step S32). When it is determined that the start/stop switch, of the operating switches 21, has been pressed (yes at step S32), the CPU 60 advances the processing to step S33. When it is not determined that the start/stop switch has been pressed (no at step S32), the CPU 60 repeatedly performs the processing at step S32.

When the start/stop switch, of the operating switches 21, is pressed by the operator, the CPU 60 performs sewing re-start processing (step S33). The CPU 60 transmits a signal to the drive shaft motor control portion 87 to activate the drive shaft motor 88, in order to re-start the sewing. After transmitting the signal to activate the drive shaft motor 88, the CPU 60 returns the processing to step S24, and once more performs the sewing status progress processing.

A case will be explained, with reference to FIG. 8, in which the sewing is complete. When the sewing is complete, the CPU 60 performs error processing (step S34). The error processing will be described later. When the error processing is performed, a signal error image and a total error image are generated for all the errors that have occurred during the sewing, and are stored in the error image storage portion 77 of the RAM 62.

The CPU 60 determines whether or not the power supply switch of the sewing machine 1 has been pressed (step S35).

When the power supply switch, of the operating switches 21, is pressed by the operator, the power supply of the sewing machine 1 is switched off in a normal manner. When it is determined that the power supply switch of the sewing machine 1 has been pressed (yes at step S35), the CPU 60 ends the main processing of the sewing machine 1. When the power supply switch of the sewing machine 1 has not been pressed and the power supply continues to be supplied (no at step S35), the CPU 60 advances the processing to step S36.

The CPU 60 determines whether or not, in communication from the mobile terminal 3, an enquiry has been issued to the sewing machine 1 (step S36). In the determination as to whether or not the enquiry has been issued, when a signal requesting information has been transmitted to the communication I/F 64 of the sewing machine 1 from the mobile terminal 3 via the network 9, it is determined that the enquiry has been issued. Further, when the signal requesting the information has not been transmitted to the communication I/F 64 of the sewing machine 1 from the mobile terminal 3 via the network 9, it is determined that the enquiry has not been issued. When the enquiry has not been issued (no at step S36), the CPU 60 returns the processing to step S35, and repeats the determination at step S35 until the power supply is switched off. When the enquiry has been issued (yes at step S36), the CPU 60 advances the processing to step S38.

The CPU 60 of the sewing machine 1 transmits, via the network 9, the single error image, the total error image, the error information, and the sewing information for all the errors that have occurred during the sewing, to the mobile terminal 3 that has issued the enquiry. As the information that is transmitted, the single error images and the total error image are read out from the error image storage portion 77 of the RAM 62, the error information is read out from the error information storage portion 75, and the sewing information is read out from the sewing information storage portion 73. After the transmission processing has been performed, the CPU 60 returns the processing to step S35, and repeats the processing at step S35, step S36, and step S38 until the power supply is switched off. When the enquiry from the mobile terminal 3 is received a plurality of times, the sewing machine 1 transmits, to the mobile terminal 3, the single error images, the total error image, the error information, and the sewing information the same number of times as the number of times of the enquiry.

Error Processing of Sewing Machine 1

Figure 9:
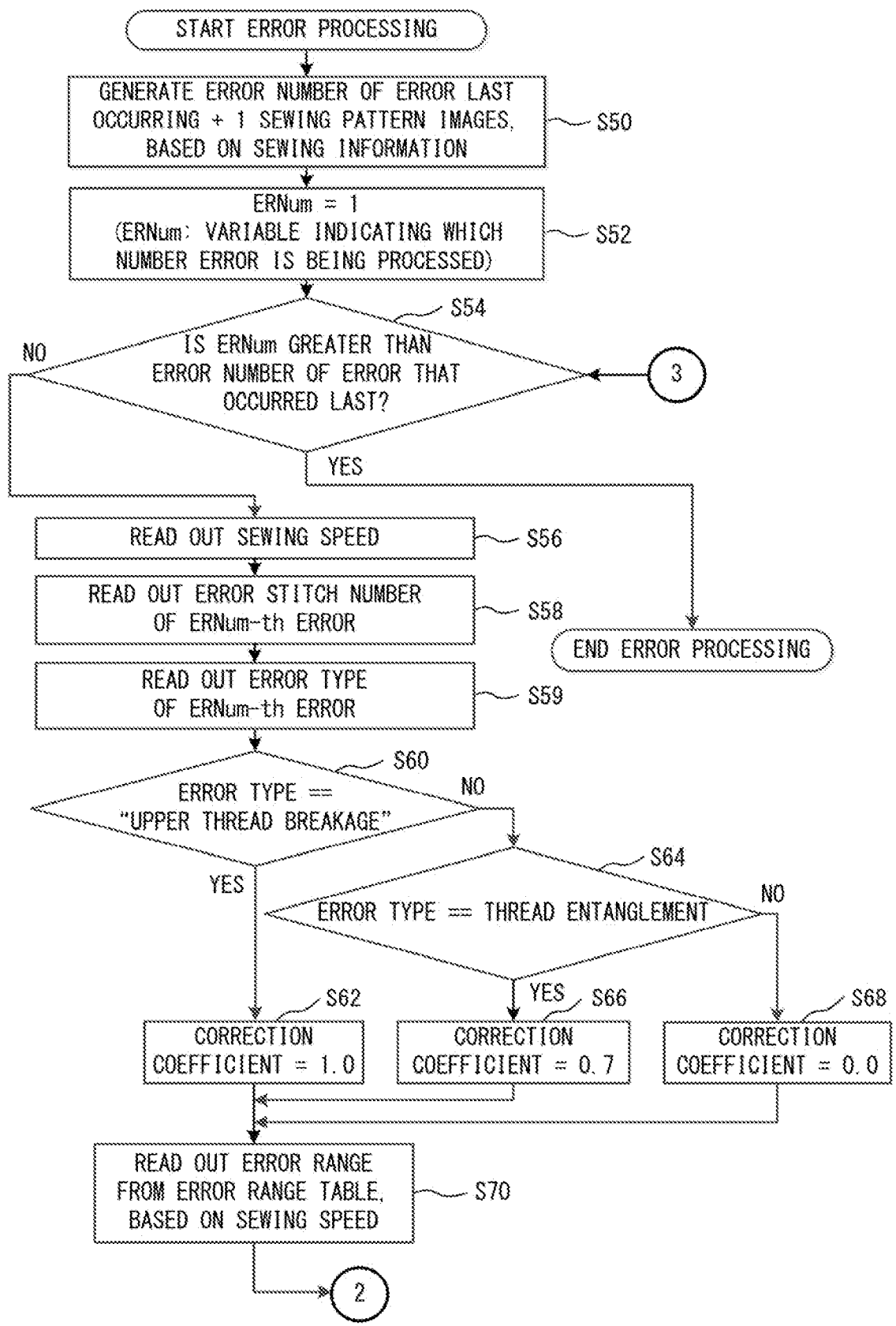
FIG. 9 is a flowchart (1/2) of error processing performed by the sewing machine 1.
Figure 10:
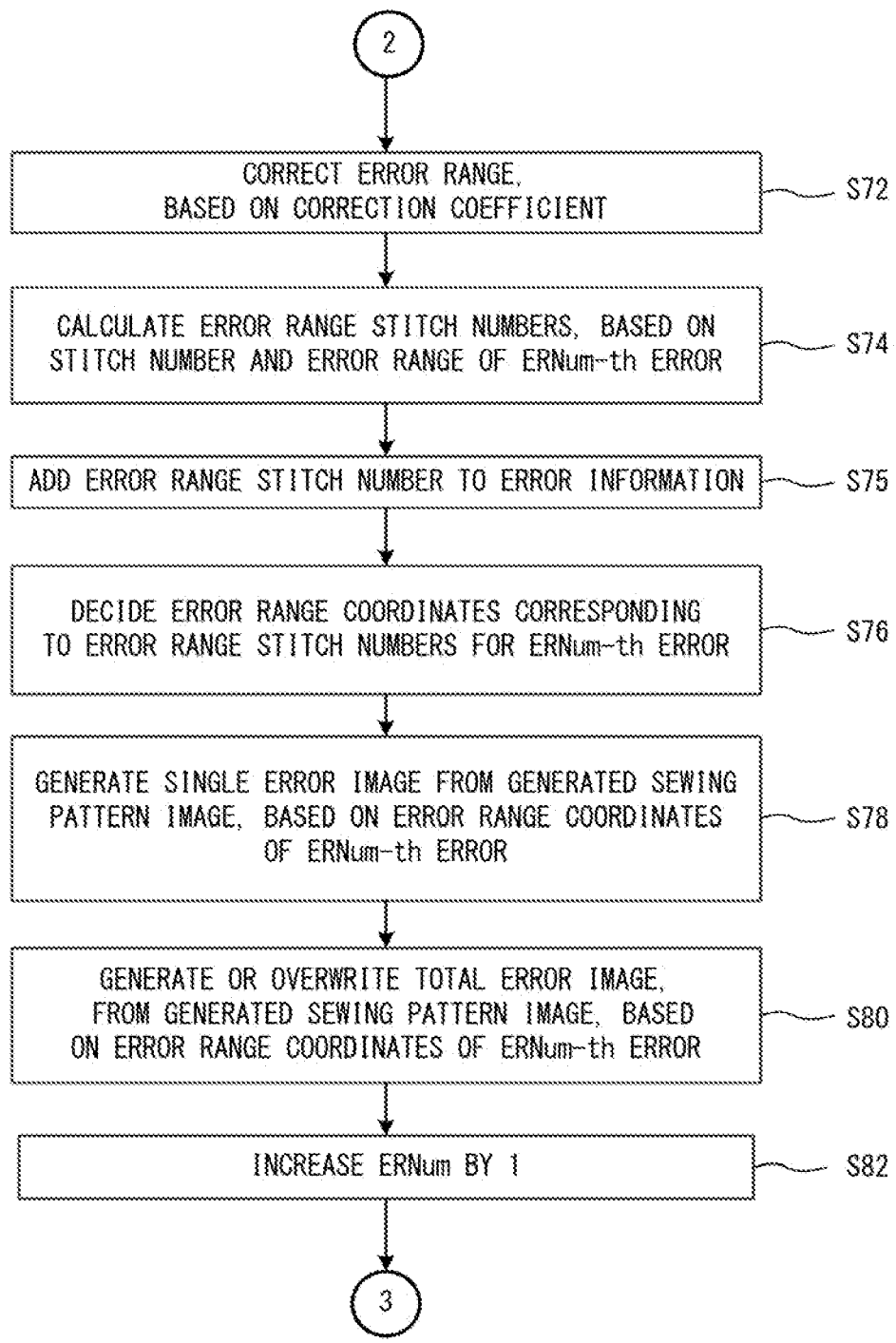
FIG. 10 is a flowchart (2/2) of the error processing performed by the sewing machine 1.

The error processing will be explained with reference to FIG. 9 and FIG. 10. Each processing step of the series of processing shown by step S50 to step S82 in FIG. 9 and FIG. 10 is performed by the CPU 60 of the sewing machine 1.

When the error processing is started, the CPU 60 generates the sewing pattern images of a number that is 1 more than the numerical value of the error number stored in the error information storage portion 75, which is the error number of the error that has occurred last during the sewing (step S50). The sewing pattern image is an image showing a shape of the pattern to be sewn, and is an image representing, as a preview, a finished state of the pattern to be sewn. The sewing pattern image is generated on the basis of the sewing information stored in the sewing information storage portion 73. The generated sewing pattern image is stored in the sewing pattern image storage portion 76.

The CPU 60 sets a value of a variable ERNum to "1" (step S52). The variable ERNum is a value used to ascertain, in processing to be described below, which number of occurrence is the error that is currently being processed by the CPU 60. The variable ERNum corresponds to the error number of each of the errors. For example, when the value of the variable ERNum is "2," this indicates that the CPU 60 is currently processing the second error that has occurred.

The CPU 60 determines whether or not the value of the variable ERNum is larger than the error number of the error that has occurred last during the sewing (step S54). When the value of the variable ERNum is equal to or less than the error number of the error that has occurred last (no at step S54), that is, when the processing at step S56 to step S82 is not complete for all the errors that have occurred, the CPU 60 advances the processing to step S56. When the value of the variable ERNum is greater than the error number of the error that has occurred last (yes at step S54), that is, when the processing at step S56 to step S82 is complete for all the errors that have occurred, the CPU 60 ends the error processing.

The CPU 60 reads out the stored sewing speed from the sewing speed storage portion 74 (step S56).

The CPU 60 reads out the error stitch number, from the error information storage portion 75, for the ERNum-th error that has occurred, that is, for the error currently being processed (step S58).

The CPU 60 reads out the error type, from the error information storage portion 75, for the ERNum-th error that has occurred (step S59).

The CPU 60 determines whether or not the error type read out at step S59 is the upper thread breakage (step S60). When the error type is the upper thread breakage (yes at step S60), the CPU 60 advances the processing to step S62. When the error type is not the upper thread breakage (no at step S60), the CPU 60 advances the processing to step S64.

When the error type is the upper thread breakage (yes at step S60), based on the correction coefficient table 500 stored in the table storage portion 72, the CPU 60 sets a correction coefficient to "1.0" (step S62).

The CPU 60 determines whether or not the error type read out at step S59 is the thread entanglement (step S64). When the error type is the thread entanglement (yes at step S64), the CPU 60 advances the processing to step S66. When the error type is not the thread entanglement (no at step S64), the CPU 60 advances the processing to step S68.

When the error type is the thread entanglement (yes at step S64), based on the correction coefficient table 500 stored in the table storage portion 72, the CPU 60 sets the correction coefficient to "0.7" (step S66).

When the type of the error this time is neither the upper thread breakage and the thread entanglement, and is the lower thread breakage, based on the correction coefficient table 500 stored in the table storage portion 72, the CPU 60 sets the correction coefficient to "0.0" (step S68).

Based on the sewing speed read out at step S56, the CPU 60 reads out the error range from the error range table 400 stored in the table storage portion 72 (step S70). For example, when the sewing speed is 400 spm, the read out error range is the range of 7 stitches on either side of the error stitch number that is the reference.

Based on the correction coefficient set at step S60 to step S68, the CPU 60 corrects the error range (step S72) (refer to FIG. 10). The correction is performed by multiplying the error range by the correction coefficient and rounding off after the decimal point. The error range described at step S74 to step S80 indicates the error range after the correction.

The CPU 60 calculates error range stitch numbers for the ERNum-th error that has occurred (step S74). The error range stitch numbers represent the stitch numbers from the first stitch number to the last stitch number in the error range, and are calculated on the basis of the error stitch number and the error range. For example, when the sewing stitch being sewn by the sewing machine 1 at the time the error occurs is the 100-th stitch from the start of the sewing, the error stitch number is "100." Then, when the error range is the range of 10 stitches on either side of the error stitch number that is the reference, the error range stitch numbers represent "90 to 110."

The CPU 60 adds the error range stitch number calculated at step S74 to the error information, for the ERNum-th error that has occurred (step S75). The error information is stored in the error information storage portion 75.

The CPU 60 decides the coordinates of the sewing stitches corresponding to the error range stitch numbers, for the ERNum-th error that has occurred (step S76). The coordinates of the sewing stitches corresponding to the error range stitch numbers are decided from the absolute total stitch number and the coordinates of the sewing stitches, of the sewing information stored in the sewing information storage portion 73. Hereinafter, the decided coordinates of the sewing stitches are described as error range coordinates.

The CPU 60 generates the single error image for the ERNum-th error that has occurred (step S78). The single error image is the image in which an error occurrence position is drawn, on the sewing pattern image, for each of the errors that have occurred during the sewing. For example, a case will be explained in which the single error image is generated for the first error that has occurred. The CPU 60 reads out one of the sewing pattern images among the sewing pattern images stored in the sewing pattern image storage portion 76. Then, based on the error range coordinates, a first single error image is generated by drawing the occurrence position of the first error on the read out sewing pattern image.

For the ERNum-th error that has occurred, the CPU 60 generates the new total error image, or alternatively, overwrites the occurrence position of the ERNum-th error that has occurred on the total error image generated for the error that has occurred one previously (step S80). The total error image is the image in which the occurrent positions of the errors are drawn on the sewing pattern image, for all the errors that have occurred during the sewing. In the case of the first error, the CPU 60 reads out the single sewing pattern image, of the sewing pattern images stored in the sewing pattern image storage portion 76. Then, based on the error range coordinates, the CPU 60 generates the total error image, by drawing the occurrence position of the first error on the read out sewing pattern image. In the case of a second error, the CPU 60 updates the total error image by drawing the occurrence position of the second error superimposed on the total error image generated at the time of the first error. From here on, the update processing is performed in a similar manner until the last error has occurred, and the total error image is completed when the sewing is complete.

The CPU 60 increases the value of the variable ERNum by 1 (step S82). After that, the CPU 60 returns the processing to step S54 (refer to FIG. 9).

Display Processing of Mobile Terminal 3

Figure 11:
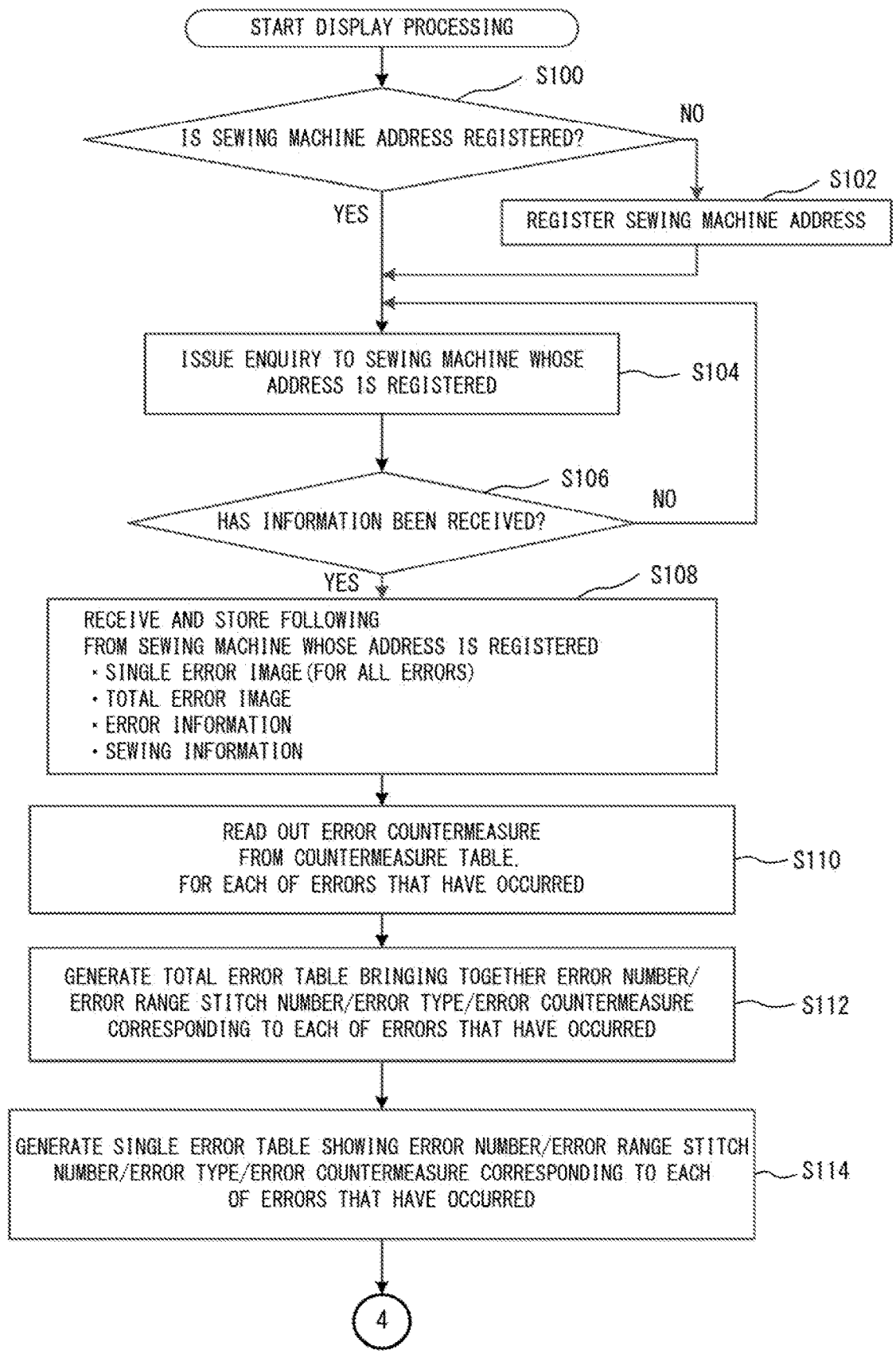
FIG. 11 is a flowchart (1/2) of display processing performed by the mobile terminal 3.
Figure 12:
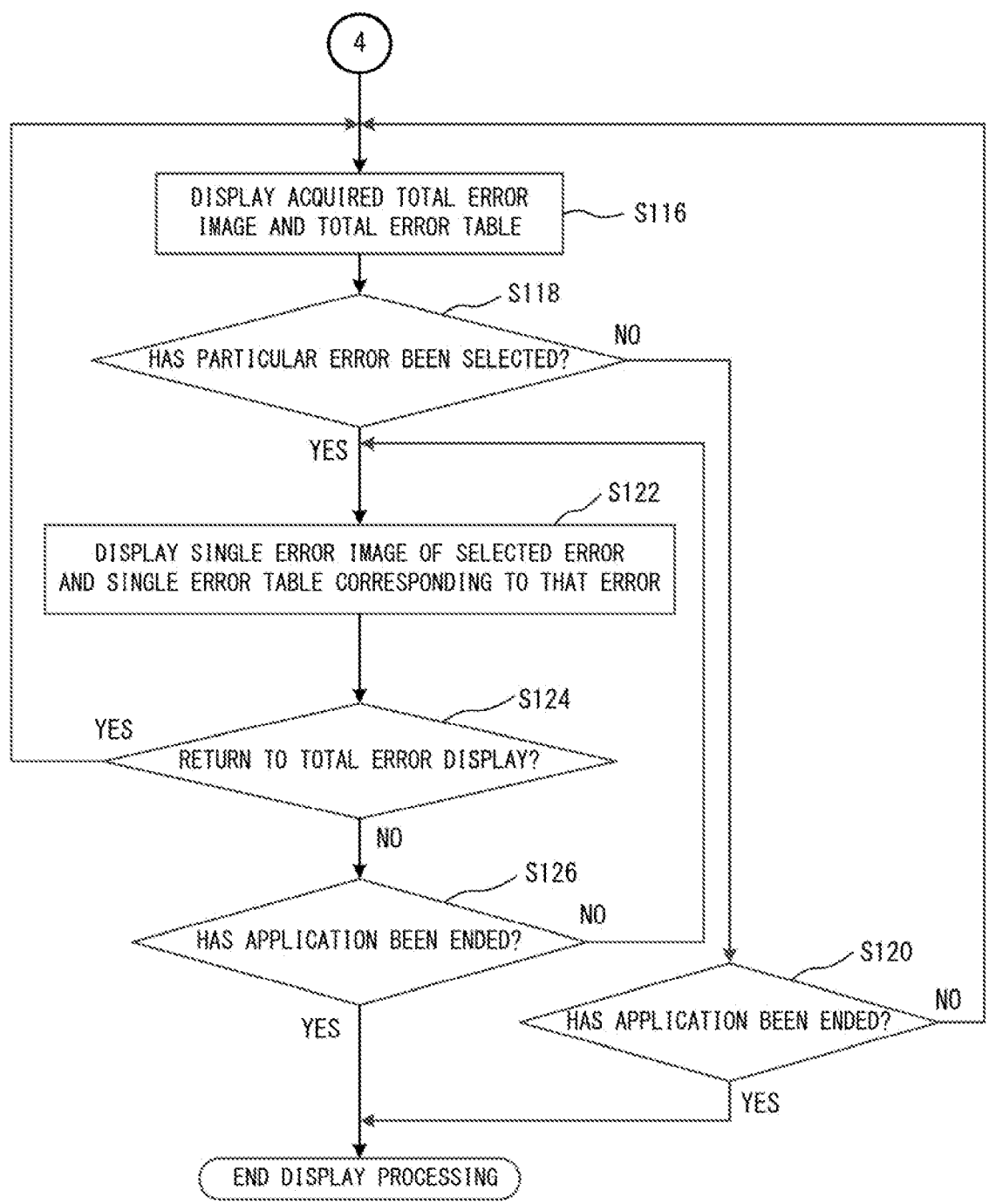
FIG. 12 is a flowchart (2/2) of the display processing performed by the mobile terminal 3.

The display processing of the mobile terminal 3 will be explained with reference to FIG. 11. Each processing step of the series of processing shown by step S100 to step S126 in FIG. 11 and FIG. 12 is performed by the CPU 111 of the mobile terminal 3.

In the mobile terminal 3, when the display processing is started, the CPU 111 determines whether or not the address of the sewing machine is registered (step S100). In this determination, it is determined whether or not the address of the sewing machine is present in the address information storage portion 126 inside the flash ROM 113 of the mobile terminal 3. When the address is registered (yes at step S100), the CPU 111 advances the processing to step S104. When the address is not yet registered (no at step S100), the CPU 111 advances the processing to step S102.

The CPU 111 registers the address of the sewing machine (step S102). For example, when registering the address of the sewing machine 1, the address of the sewing machine 1 is stored in the address information storage portion 126 and is registered by the operator operating the touch panel 32 of the mobile terminal 3 and manually inputting the address of the sewing machine 1. This registered address is the same address as the address stored in the address information storage portion 71 of the sewing machine 1. The sewing machine 1 of the address registered here performs communication with the mobile terminal 3.

The CPU 111 issues the enquiry, to the sewing machine 1 whose address is registered, in order to receive information relating to the error, such as the error image and the like (step S104). The enquiry is issued from the CPU 111 of the mobile terminal 3 to the CPU 60 of the sewing machine 1, via the network 9, by transmitting an enquiry signal.

The CPU 111 determines whether or not the information transmitted from the sewing machine 1 as a result of the enquiry has been received (step S106). The information transmitted from the sewing machine 1 is the single error image, the total error image, the error information, and the sewing information for all the errors that have occurred during the sewing. When the information has been received (yes at step S106), the CPU 111 advances the processing to step S108. When the information has not been received (no at step S106), the CPU 111 returns the processing to step S104, and once more issues the enquiry. The CPU 111 repeats the processing at step S104 to step S106 until the information is received from the sewing machine 1.

When the information has been received (yes at step S106), the CPU 111 respectively stores the information transmitted from the sewing machine 1 whose address is registered (that is, the single error image, the total error image, the error information, and the sewing information for all the errors that have occurred during the sewing) in each of the storage portions of the RAM 112 (step S108). The single error image and the total error image are stored in the error image storage portion 124. The error information is stored in the error information storage portion 123. The sewing information is stored in the sewing information storage portion 122.

For each of the errors that has occurred during the sewing, the CPU 111 reads out an error countermeasure from the countermeasure table 600 stored in the table storage portion 121 (step S110). Of the error information stored in the error information storage portion 123, the error countermeasure corresponding to each of the error types is read out from the countermeasure table 600, based on the error type. When there is a plurality of the countermeasures for the single error type, all of the error countermeasures are read out.

The CPU 111 generates a total error table (step S112). The total error table is a table bringing together the error number, the error range stitch numbers, the error type, and the error countermeasure, for all the errors that have occurred during the sewing. The total error table is generated on the basis of the error numbers, the error range stitch numbers, and the error types of the error information stored in the error information storage portion 123, and on the error countermeasures read out at step S110. The generated total error table is stored in the error table storage portion 125.

The CPU 111 generates the single error table for each of the errors that has occurred during the sewing (step S114). The single error table is a table in which, in the total error table, the error number, the error range stitch numbers, the error type, and the error countermeasure of the error selected by the operator are drawn in a highlighted state. The generated single error table is stored in the error table storage portion 125.

Figure 13:
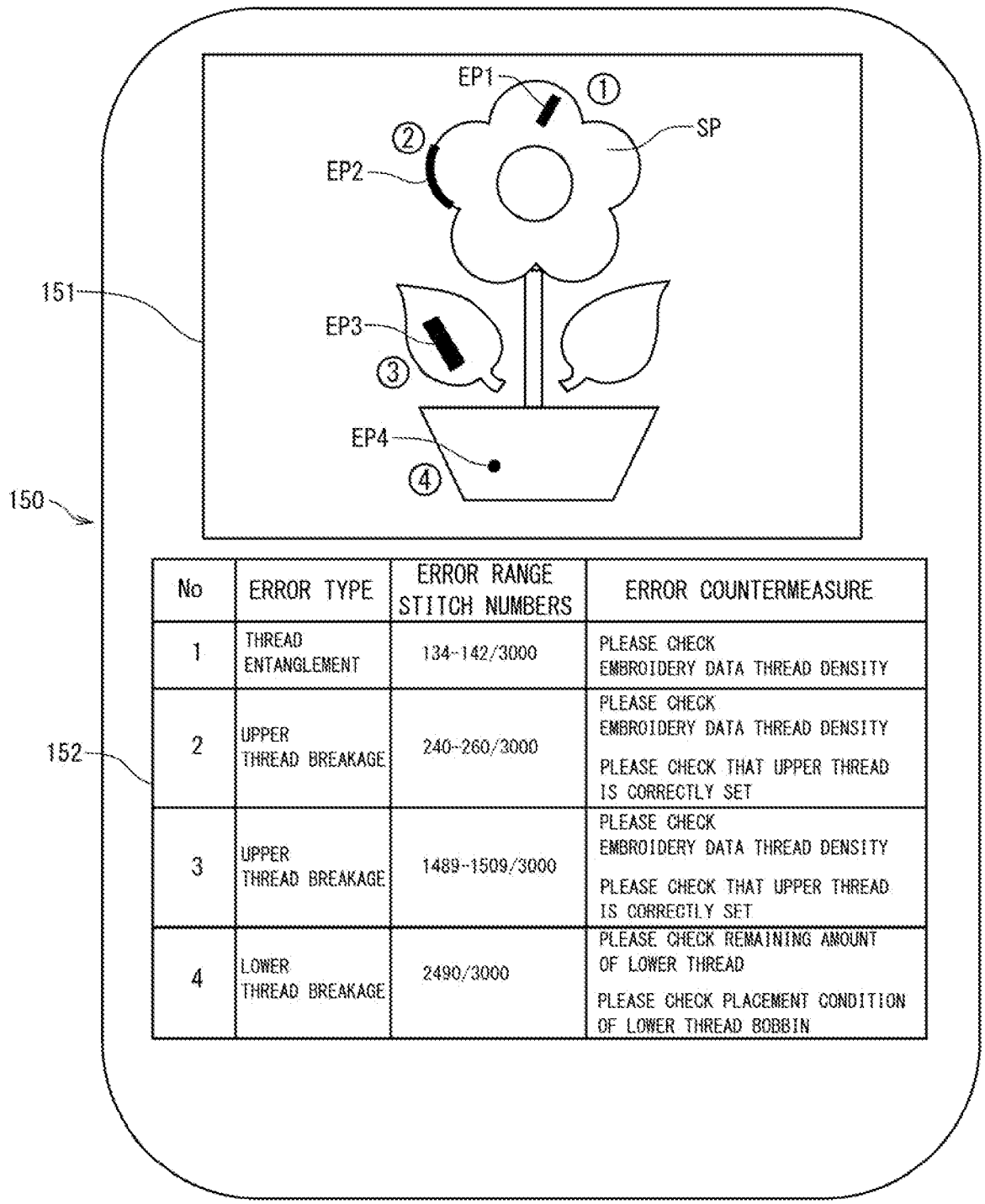
FIG. 13 is an explanatory diagram showing a total error display screen 150, which is an example of a display screen of a total error image 151 and a total error table 152.

The CPU 111 displays the total error image and the total error table on the display 33 (step S116) (refer to FIG. 12). A total error display screen 150 that is displayed on the display 33 will be explained with reference to FIG. 13. The total error display screen 150 is configured by a screen displaying a total error image 151 and a total error table 152. The total error image 151 is formed by drawing four error occurrence positions EP1 to EP4 corresponding to four errors that have occurred during the sewing on a sewing pattern image SP, using black regions. The sewing pattern image SP is an image showing a sewing pattern of a flower. Regions surrounded by outer contours of the sewing pattern image SP are regions in which the sewing stitches are formed in the actual sewing pattern. Encircled numbers 1 to 4 displayed on the total error image 151 respectively correspond to No. 1 to No. 4 of the total error table 152. The total error table 152 is configured by the error number, the error type, the error range stitch numbers and the error countermeasure, for each of the errors per row, for the four errors that have occurred during the sewing. In the total error table 152 shown in FIG. 13, No. corresponds to the error number. The error range stitch numbers shown in FIG. 13 are represented in a format indicating a comparison with the absolute total stitch number, as "error range stitch number/absolute total stitch number."

The CPU 111 determines whether or not a particular error has been selected on the total error display screen 150 (step S118). The selection of the particular error is performed by the operator operating the touch panel 32 and tapping the occurrence position of the particular error on the total error image 151 displayed on the total error display screen 150, or tapping the row of the particular error on the total error table 152. When the particular error has been selected (yes at step S118), the CPU 111 advances the processing to step S122. When the particular error has not been selected (no at step S118), the CPU 111 advances the processing to step S120.

When the particular error has not been selected, the CPU 111 determines whether or not the application has been ended (step S120). In the known mobile terminal 3, while the application is activated, the application can be forcibly ended by the operator performing a predetermined operation. When the application has been ended (yes at step S120), the CPU 111 ends the display processing. When the application has not been ended (no at step S120), the CPU 111 returns the processing to step S116, and displays the total error display screen 150 on the display 33.

Figure 14:
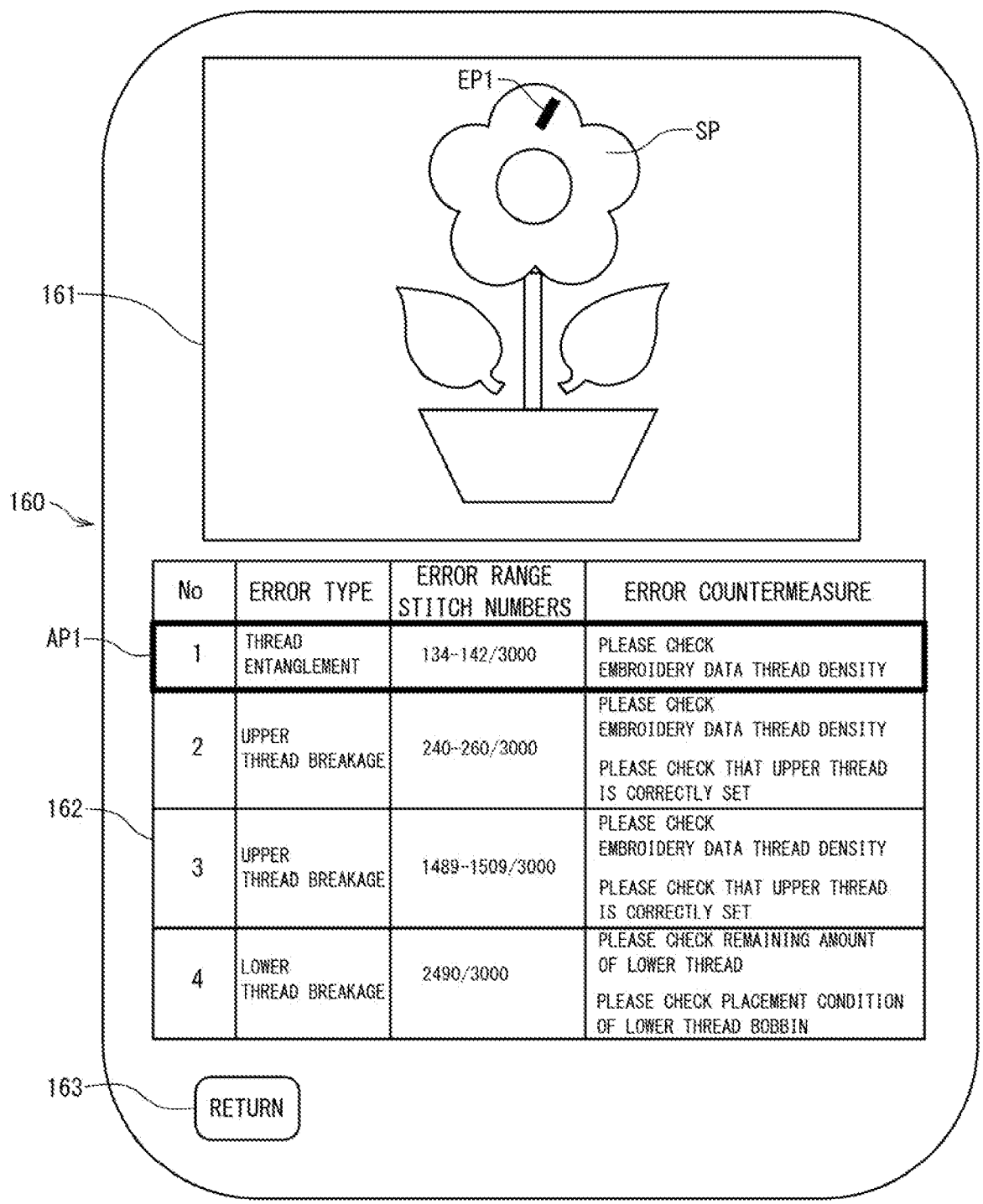
FIG. 14 is an explanatory diagram showing a single error display screen 160, which is an example of a display screen of a single error image 161 and a single error table 162 relating to a first error.
Figure 15:
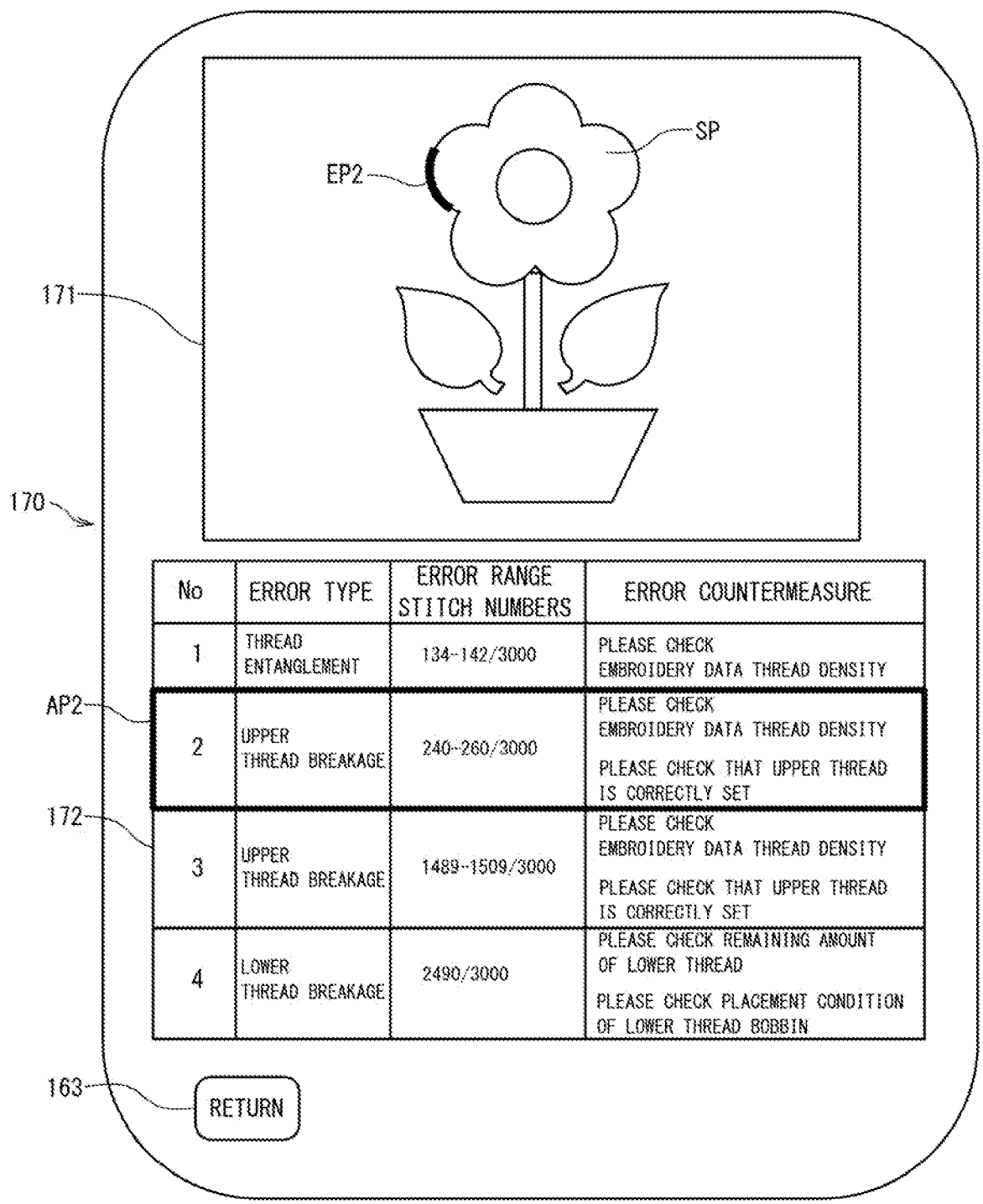
FIG. 15 is an explanatory diagram showing a single error display screen 170, which is an example of a display screen of a single error image 171 and a single error table 172 relating to a second error.
Figure 16:
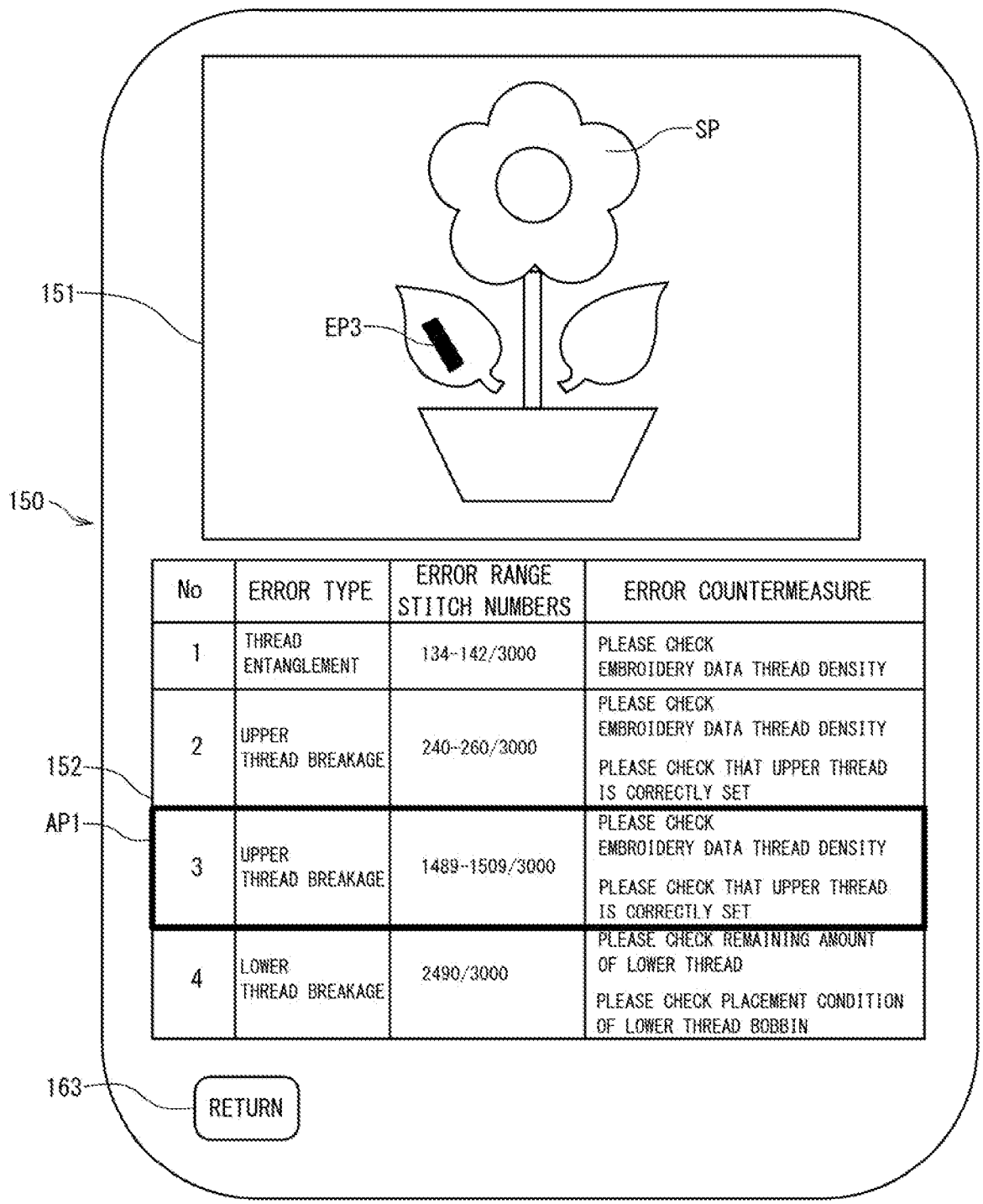
FIG. 16 is an explanatory diagram showing a single error display screen 180, which is an example of a display screen of a single error image 181 and a single error table 182 relating to a third error.
Figure 17:
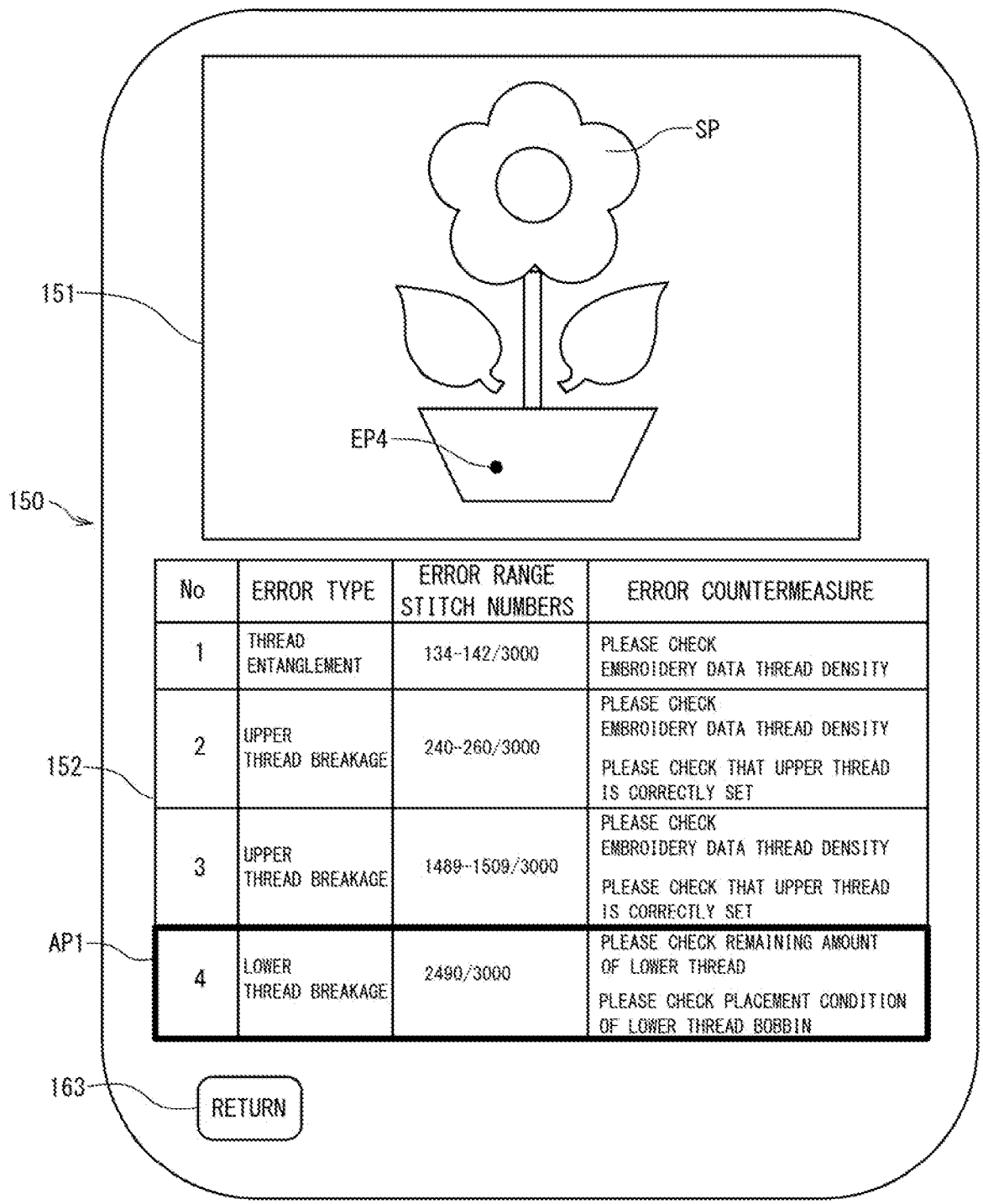
FIG. 17 is an explanatory diagram showing a single error display screen 190, which is an example of a display screen of a single error image 191 and a single error table 192 relating to a fourth error.

When the particular error has been selected, the CPU 111 displays the single error image of the selected particular error, and the single error table corresponding to that error (step S122). A case in which the first error is selected and a single error display screen 160 is displayed on the display 33 will be explained with reference to FIG. 14. The single error display screen 160 is configured by a screen displaying a single error image 161, a single error table 162, and a return button 163. The single error image 161 is formed by drawing the error occurrence position EP1 for the selected first error on the sewing pattern image SP, using the black region. The single error table 162 is configured by the error number, the error type, the error range stitch numbers and the error countermeasure, for each of the errors per row, for the four errors that have occurred during the sewing. A row AP1 of the selected first error is displayed in a highlighted state as a result of being surrounded by a thick black line. When each of the second to fourth errors shown in FIG. 15 to FIG. 17 is selected, the display of each of single error display screens 170 to 190 respectively including single error images 171 to 191 and single error tables 172 to 192 is performed in the same manner.

When the single error display screen 160 is displayed, the CPU 111 determines whether or not to return to the total error display screen 150 (step S124). In order to return to the total error display screen 150, the operator tapes the return button 163. When the return button 163 has been tapped (yes at step S124), the CPU 111 returns the processing to step S116, and the total error display screen 150 is once more displayed. When the return button 163 has not been tapped (no at step S124), the CPU 111 advances the processing to step S126.

In a similar manner to step S120, the CPU 111 determines whether or not the application has been ended (step S126). When the application has not been ended (no at step S126), the CPU 111 returns the processing to step S122, and once more displays the selected single error display screen 160. When the application has been ended (yes at step S126), the CPU 111 ends the display processing.

Effects of Embodiment

In the embodiment, a configuration is adopted in which the sewing machine 1 generates the total error image and the single error image in the processing at step S80 and step S78, and the mobile terminal 3 displays, on the display 33, the total error image and the single error image received by communication from the sewing machine 1. According to this configuration, it is not necessary for the mobile terminal 3 to perform information processing in order to generate the error images, and thus, the processing to rapidly display the error images can be performed.

In the embodiment, with respect to the plurality of errors that have occurred during the sewing, the occurrence positions of all the errors are displayed after the end of the sewing. Thus, the operator can easily find the error occurrence positions on the actual sewing object 5, by first checking the error occurrence positions displayed on the display 33 after the end of the sewing, then removing the actual sewn sewing object 5 from the sewing machine 1 and examining the sewing object 5. Further, conditions of a relationship between the occurrence of the plurality of errors and the like can be easily verified.

In the embodiment, the total error display screen 150 shown in FIG. 13 displays the total error image 151 in which the error occurrence positions are drawn, and the total error table 152 that explains the error types, the countermeasures, and the like. Thus, on the total error display screen 150, as well as being able to easily check the occurrence position of each of the errors from the total error image 151, from the total error table 152, the operator is also able to ascertain, on the spot, the countermeasure to resolve each of the errors. Further, in the embodiment, the single error display screen 160 shown in FIG. 14 and the like displays the single error image 161 in which the occurrence position of the particular error is drawn, and the single error table 162 that explains the error type, the countermeasure, and the like for the particular error. Thus, on the single error display screen 160, as well as being able to easily check the occurrence position of the particular error from the single error image 161, from the single error table 162, the operator is also able to ascertain, on the spot, the specific countermeasure to resolve the particular error. Further, the operator can use the acquired information relating to the error as reference information when creating other sewing pattern data.

In the embodiment, in the processing at step S28, the CPU 60 determines whether or not the error has occurred by determining whether or not the detection signal notifying the occurrence of the error has been received. Thus, in comparison to a configuration in which the error occurrence is determined when the drive shaft motor 88 has stopped, by receiving the detection signal, the CPU 60 can immediately verify the error occurrence from when the error actually occurs. Due to this rapid verification, by the processing at step S70 to step S74, the CPU 60 can accurately decide the error range stitch numbers that are impacted by the error, taking as the reference the stitch number of the sewing stitch being sewn by the sewing machine 1 at the time at which the detection signal is received.

Modified Example

Figure 18:
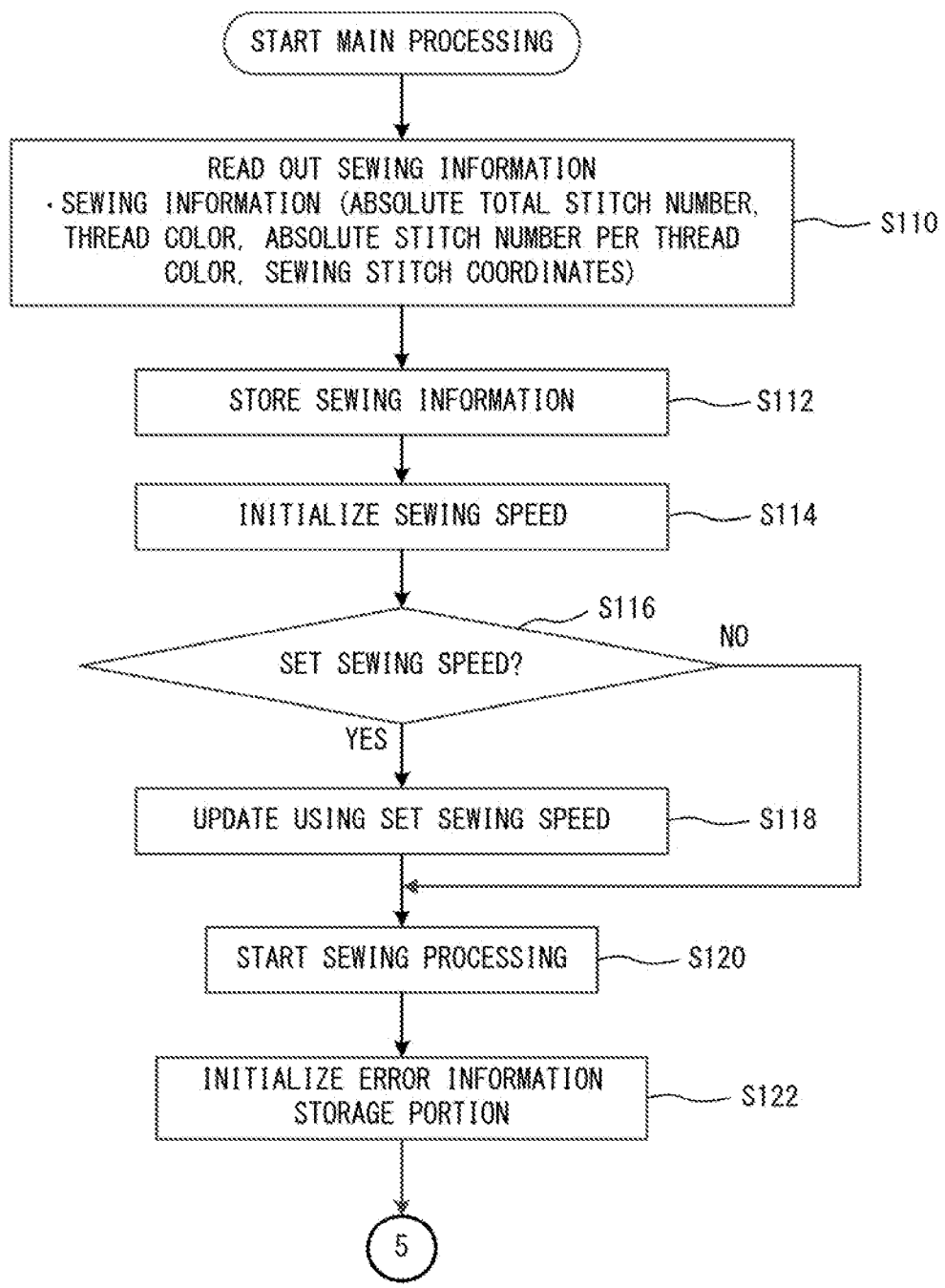
FIG. 18 is a flowchart (1/2) of main processing according to a modified example performed by the sewing machine 1.
Figure 19:
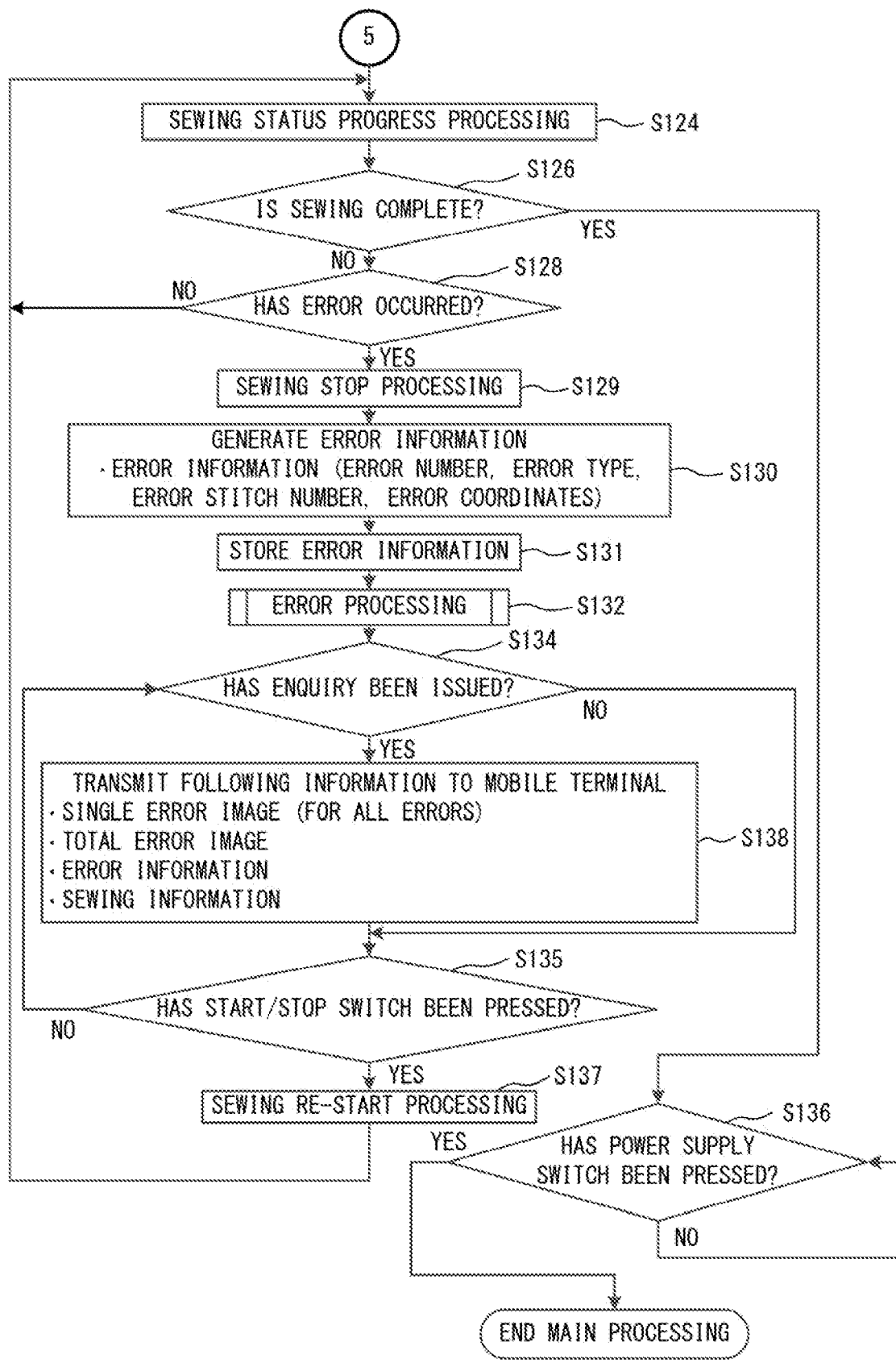
FIG. 19 is a flowchart (2/2) of the main processing according to the modified example performed by the sewing machine 1.

A modified example of the present disclosure will be explained. The modified example differs from the above-described embodiment in the main processing of the sewing machine 1. In the modified example, the same reference signs as in the above-described embodiment will be used for the configuration portions that are the same as those of the sewing machine 1 and the mobile terminal 3 of the above-described embodiment, and an explanation of the configuration portions that are the same will be omitted.
Operations of Sewing Error Management System 100 According to Modified Example Operations of the sewing error management system 100 according to the modified example will be explained with reference to FIG. 18 and FIG. 19. Processing from step S110 to step S124 corresponds to the processing at step S10 to step S24 of the above-described embodiment, and the same processing is performed. Thus, an explanation thereof will be omitted here. By the processing at step S110 to step S124, the initial setting of the sewing is performed, and the sewing processing is started.

When the sewing status is updated at step S124, by determining whether the updated stitch number of the sewing stitch currently being sewn by the sewing machine 1 matches the absolute total stitch number, of the sewing information stored in the sewing information storage portion 73 of the RAM 62, the CPU 60 determines whether or not the sewing is complete (step S126). When the stitch number of the sewing stitch currently being sewn by the sewing machine 1 matches the absolute total stitch number, the CPU 60 determines that the sewing is complete (yes at step S126), advances the processing to step S136, and repeats the determination processing at step S136 until the power supply switch is pressed. When the stitch number of the sewing stitch currently being sewn by the sewing machine 1 does not match the absolute total stitch number, the CPU 60 determines that the sewing is still continuing (no at step S126), and advances the processing to step S128.

Processing at step S128 to step S131 corresponds to the processing at step S28 to step S31 of the above-described embodiment, and the processing is the same. Thus, an explanation thereof will be omitted here. By the processing at step S128 to step S131, the sewing is stopped, and the error information relating to the error that has occurred is stored in the error information storage portion 75.

When the error that has occurred is stored, the CPU 60 performs the error processing (step S132). The error processing is performed in the same way as the above-described embodiment. When the error processing is performed, the single error image and the total error image are generated for all the errors that have occurred during the sewing, and are stored in the error image storage portion 77 of the RAM 62.

The CPU 60 determines whether or not the enquiry has been issued from the mobile terminal 3 to the sewing machine 1 (step S134). The determination as to whether or not the enquiry has been issued is performed by determining whether or not the signal requesting the information has been transmitted from the mobile terminal 3 to the communication I/F 64 of the sewing machine 1 via the network 9. When the enquiry has not been issued (no at step S134), the CPU 60 advances the processing to step S135. When the enquiry has been issued (yes at step S134), the CPU 60 advances the processing to step S138.

When the enquiry has been issued from the mobile terminal 3 to the sewing machine 1, the CPU 60 of the sewing machine 1 transmits the single error image, the total error image, the error information, and the sewing information for all the errors that have occurred during the sewing, to the mobile terminal 3 that has issued the enquiry (step S138). The single error image and the total error image are stored in the error image storage portion 77 of the RAM 62, the error information is stored in the error information storage portion 75, and the sewing information is stored in the sewing information storage portion 73. After the transmission processing, the CPU 60 advances the processing to step S135.

The CPU 60 determines whether or not the start/stop switch has been pressed (step S135). When it is determined that the start/stop switch, of the operating switches 21, has been pressed (yes at step S135), the CPU 60 advances the processing to step S137. When it is determined that the start/stop switch has not been pressed (no at step S135), the CPU 60 returns the processing to step S134.

When the start/stop switch, of the operating switches 21, is pressed by the operator, the CPU 60 performs the sewing re-start processing (step S137). The CPU 60 transmits the signal to the drive shaft motor control portion 87 to activate the drive shaft motor 88, in order to re-start the sewing. After transmitting the signal to activate the drive shaft motor 88, the CPU 60 returns the processing to step S124, and once more performs the sewing status progress processing.

When the sewing is complete, the CPU 60 determines whether or not the power supply of the sewing machine 1 has been switched off (step S136). When the power supply switch, of the operating switches 21, is pressed by the operator, the power supply of the sewing machine 1 is switched off in the normal manner. When it is determined that the power supply of the sewing machine 1 has been switched off (yes at step S136), the CPU 60 ends the main processing of the sewing machine 1. When the power supply of the sewing machine 1 continues to be supplied (no at step S136), the CPU 60 repeats the processing at step S136 until the power supply is switched off.

Effects of Modified Example

In the modified example, a configuration is adopted in which, by the processing at step S132 in the main processing shown in FIG. 15, the sewing machine 1 generates the total error image and the single error image in relation to the error that has occurred during the sewing, and the mobile terminal 3 can receive the total error image and the single error image, by communication with the sewing machine 1, during the sewing. According to this configuration, the operator can rapidly verify, immediately after the occurrence of the error even during the sewing, the occurrence position of the error that has occurred during the sewing.

Other Modified Examples

The embodiment of the present disclosure is described above, but various modifications can be added by a person skilled in the art, insofar as they do not depart from the scope and gist of the present disclosure.

(1) In the embodiment, the configuration is adopted in which the sewing machine 1 generates the total error image and the single error image in the processing at step S80 and step S78, and the mobile terminal 3 displays, on the display 33, the total error image and the single error image received by communication from the sewing machine 1, but the present disclosure is not limited to this configuration. For example, a configuration may be adopted in which the sewing machine 1 displays, on the display 15 of the sewing machine 1, the total error image and the single error image generated in the processing at step S80 and step S78. In this modified example, the sewing machine 1 as a single unit is an example of a sewing error management device of the present disclosure. Further, a configuration may be adopted in which the mobile terminal 3 receives necessary information by communication from the sewing machine 1, and generates the total error image and the single error image. In other words, a configuration may be adopted in which the mobile terminal 3 performs the error processing of the embodiment.

(2) In the embodiment, the sewing error management device is configured as the sewing error management system 100 provided with the sewing machine 1 and the mobile terminal 3. However, the present disclosure is not limited to this configuration. For example, the sewing error management device may be configured by the sewing machine 1 as a single unit, or by the mobile terminal 3 as a single unit.

(3) In the embodiment, the external device is configured as the mobile terminal 3, but the present disclosure is not limited to this configuration. For example, the external device may be a desktop PC, a notebook PC, a television connected to the network 9, or the like, and it is sufficient that the external device be a device provided with a function to at least acquire the error image and control the display of the error image. In the case of a modified example in which the external device is configured by the PC, as long as that PC is provided with a function to edit the sewing information of the sewing pattern and the like, as the error countermeasure to the thread entanglement, the operator can correct the sewing information so as to reduce a thread density, using the control of the PC.

(4) In the embodiment, the sewing pattern image is the image showing the shape of the pattern to be sewn, and is configured as the image representing, as a preview, the finished state of the pattern to be sewn. However, the present disclosure is not limited to this configuration. For example, the sewing pattern image may be an image showing a shape of an unfinished pattern to be sewn, during the sewing. Further, the sewing pattern image may be an image that enlarges and shows a shape of a portion of the pattern surrounding the error occurrence position, of the pattern to be sewn.

(5) In the embodiment, the sewing stitch coordinates are configured to be represented by a rectangular coordinate system on a plane. However, the present disclosure is not limited to this configuration. For example, the sewing stitch coordinates may be configured to be represented by circular polar coordinates of a polar coordinate system.

(6) In the embodiment, the configuration is adopted in which the error type is limited to the upper thread breakage, the thread entanglement, and the lower thread breakage, but the present disclosure is not limited to this configuration. For example, various other error types, such as a broken needle, wrinkles in the fabric, and the like, may be used as the error type. When the number of error types increases, the correction coefficient and the countermeasure corresponding to the added error type are added to the correction coefficient table 500 and the countermeasure table 600.

(7) In the embodiment, the configuration is adopted in which the correction coefficient for the upper thread breakage is set to "1.0", the correction coefficient for the thread entanglement is set to "0.7", and the correction coefficient for the lower thread breakage is set to "0.0", but the present disclosure is not limited to this configuration. For example, a configuration may be adopted in which the correction coefficient is set by the operator in accordance with the sewing status. Further, a configuration may be adopted in which correction is performed without using the correction coefficient, using a predetermined mathematical formula in accordance with the error type, or the like. Further, a configuration may be adopted in which the error range is used in an uncorrected state.

(8) In the embodiment, a configuration is adopted in which the error range is read out from the error range table 400 based on the sewing speed, but the present disclosure is not limited to this configuration. For example, the error range may be calculated from a predetermined mathematical formula using the sewing speed as a variable.

(9) In the embodiment, a configuration is adopted in which the sewing information, the error information, and the error images are stored in each of the storage portions of the sewing machine 1 and the mobile terminal 3, but the present disclosure is not limited to this configuration. For example, a configuration may be adopted in which the sewing information, the error information, and the error images are stored in an external storage device connected via an external USB cable, on a micro SD card ("micro SD" is a registered trademark of SD-3C LLC), in a server, and the like. In this case, the sewing machine 1 or the mobile terminal 3 is configured to be able to be connected via the USB cable or the like.

(10) In the embodiment, a configuration is adopted in which the CPU 60 determines whether or not the error has occurred by determining whether or not the detection signal notifying the occurrence of the error has been received, but the present disclosure is not limited to this configuration. For example, when the CPU 60 transmits the signal to stop the drive shaft motor 88 to the drive shaft motor control portion 87 when the CPU 60 has received the detection signal, the CPU 60 may determine that the error has occurred when a signal indicating that the drive shaft motor 88 is completely stopped is received from the drive shaft motor control portion 87. In the case of this modified example, the stitch number that is the number, in the formation order, of the sewing stitch being sewn by the sewing machine 1 at the time that the drive shaft motor 88 has completely stopped is the error stitch number. The error range table 400 shown in FIG. 4 is configured such that a number of the stitches formed before the stitch number when the drive shaft motor 88 has completely stopped is set as the error range. Thus, it is sufficient that the operator verify the state of the error occurrence position by working back from the position of the stitch at which the sewing has stopped, and the actual occurrence position of the error on the sewing object 5 is easily verified.

(11) In the embodiment, the configuration is adopted in which the enquiry is issued from the mobile terminal 3 to the sewing machine 1 in order for the mobile terminal 3 to receive, from the sewing machine 1, the information relating to the error, such as the error image and the like. However, the present disclosure is not limited to this configuration. For example, a configuration may be adopted in which an enquiry is issued from the sewing machine 1 to the mobile terminal 3 at a time point at which the sewing is complete. Further, a configuration may be adopted in which the sewing machine 1 transmits the information relating to the error to the mobile terminal 3, regardless of the presence or absence of the enquiry from the mobile terminal 3.

(12) In the embodiment, a configuration is adopted in which it is determined whether or not the enquiry has been issued after the sewing is complete, but the present disclosure is not limited to this configuration. For example, a configuration may be adopted in which, when there has been a previous enquiry from the mobile terminal 3 to the sewing machine 1 during the sewing, the sewing machine 1 stores communication information of that enquiry, and after the sewing is complete, an enquiry is issued from the sewing machine 1 to the mobile terminal 3 based on the stored communication information. Further, a configuration may be adopted in which the sewing machine 1 transmits the information relating to the error, to the mobile terminal 3, at the time point at which the sewing is complete, regardless of the presence or absence of the enquiry from the mobile terminal 3.

(13) In the embodiment, a configuration is adopted in which the determination about the enquiry is repeated until the power supply of the sewing machine 1 is switched off, but the present disclosure is not limited to this configuration. For example, a configuration may be adopted in which, even after the power supply to the sewing machine 1 is switched off, the power continues to be supplied to the sewing machine control portion in order to issue the enquiry only, and the sewing machine 1 performs the communication with the mobile terminal 3.

(14) In the embodiment, a configuration is adopted in which the sewing pattern image used to draw the total error image and the single error image is generated in advance, before the error images are generated, but the present disclosure is not limited to this configuration. For example, a configuration may be adopted in which the sewing pattern image is generated just before the error images are generated, or at the same time as generating the error images.

(15) In the embodiment, a configuration is adopted in which the total error image is generated after the single error image is generated, but the present disclosure is not limited to this configuration. For example, a configuration may be adopted in which the single error image is generated after the total error image is generated. Further, the total error image may be generated as a summary of all the errors, at a time point at which the last error has occurred, without performing the processing at step S80 in which the total error image is overwritten each time the error occurs.

(16) In the embodiment, a configuration is adopted in which, when the address of the sewing machine is registered, the processing to register the address of the sewing machine is not performed, but the present disclosure is not limited to this configuration. For example, a configuration may be adopted in which, even when the address of the sewing machine is registered, the processing to register the address of the sewing machine is performed and the addresses of a plurality of the sewing machines are registered. In the case of this modified example, the mobile terminal 3 is configured to perform processing to select which of the sewing machines to which to issue the enquiry.

(17) In the embodiment, a configuration is adopted in which the mobile terminal 3 registers the address of the sewing machine, but the present disclosure is not limited to this configuration. For example, a configuration may be adopted in which the sewing machine registers a unique number, such as an IP address of the mobile terminal.

(18) In the embodiment, a configuration is adopted in which the total error table 152 displays, as items, the error number, the error type, the error stitch number, and the error countermeasure, but the present disclosure is not limited to this configuration. For example, the total error table 152 may additionally display a sewing machine mechanism or the like relating to the error. The total error table 152 may be configured to display the information relating to the error in a state in which the error stitch number and the like is deleted. Further, a configuration may be adopted in which the operator can customize the items the operator wishes to display.

(19) In the embodiment, a configuration is adopted in which the total error display screen 150 is displayed in advance of the single error display screen 160, but the present disclosure is not limited to this configuration. For example, a configuration may be adopted in which a display menu is displayed, and the operator selects a screen the operator wishes to display, from among the total error display screen and the plurality of single error display screens.

(20) In the embodiment, a configuration is adopted in which, on the total error display screen 150, the total error image 151 and the total error table 152 are displayed on the same screen, but the present disclosure is not limited to this configuration. For example, a configuration may be adopted in which the total error image and the total error table are displayed in separate windows, and the windows are switched by an operation by the operator. This switching configuration may also be adopted in a similar manner for the single error display screen 160.

What is claimed is:

1. A sewing error management device comprising:
a communication interface configures to communicate with a sewing machine over a network, the sewing machine configured to sew a sewing pattern formed by a plurality of stitches;
a display portion;
a first processor; and
a memory configured to store computer-readable instructions that, when executed by the first processor, instruct the processor to perform processes comprising:
acquiring, for a plurality of errors that occur in the sewing of the sewing pattern, a total error image from the sewing machine over the communication interface;
the acquired total error image having been generated by a second processor in the sewing machine by:
acquiring coordinates representing a formation position of a sewing stitch being sewn at a time point when each of the plurality of errors occurs in the sewing of the sewing pattern;
generating an error image obtained by drawing an occurrence position of each of the plurality of errors on a sewing pattern, based on the acquired coordinates on an image showing a shape of the sewing pattern; and
displaying the acquired total error image on the display portion.

2. The sewing error management device according to claim 1, wherein
the acquiring the error image includes
acquiring the total error image and a single error image, the single error image corresponding to one of the errors, of the plurality of errors that occur in the sewing of the sewing pattern, and the single error image being obtained by drawing the occurrence position of the one of the errors on the image showing the shape of the sewing pattern, and
the displaying of the acquired error image on the display portion includes
switching between display of the total error image and the single error image on the display portion, based on switching command information.

3. The sewing error management device according to claim 1, wherein
the computer-readable instructions further instruct the processor to perform a process comprising:
acquiring, for each of the plurality of errors, a type of error that actually occurs from a plurality of errors that may occur in the sewing of the sewing pattern, and
the displaying of the acquired total error image on the display portion includes
displaying the acquired type of error for each of the plurality of errors on the display portion.

4. The sewing error management device according to claim 1, wherein
the computer-readable instructions further instruct the processor to perform a process comprising:
acquiring, for each of the plurality of errors, a countermeasure associated with a type of error that actually occurs, from among a plurality of the countermeasures respectively associated with a plurality of the types of errors that may occur in the sewing of the sewing pattern, the countermeasure being used to resolve each of the errors, and
the displaying of the acquired total error image on the display portion includes
displaying the acquired countermeasure for each of the plurality of errors on the display portion.

5. The sewing error management device according to claim 1, wherein
the displaying of the acquired total error image on the display portion includes
displaying the total error image on the display portion after the sewing machine completes the sewing of the sewing pattern.

6. The sewing error management device according to claim 1, wherein
the displaying of the acquired total error image on the display portion includes
displaying the total error image on the display portion when the sewing machine stops the sewing of the sewing pattern in accordance with one of the plurality of errors occurring, and
maintaining a display state of the error image also after re-starting the sewing.

7. A sewing error management system comprising:
a sewing machine configured to sew a sewing pattern in accordance with coordinates representing formation positions of each of sewing stitches of the sewing pattern formed by a plurality of the sewing stitches, the sewing machine including
a first processor, and
a first memory configured to store computer-readable instructions that, when executed by the first processor, instruct the first processor to perform processes comprising:
acquiring the coordinates representing the formation position of the sewing stitch being sewn at a time point when an error occurs in sewing of the sewing pattern by:
acquiring a sewing speed set for sewing the sewing pattern and a sewing complete stitch number representing a number of the sewing stitches sewn from a start of the sewing of the sewing pattern to when the error occurs;
deciding an error range, based on the acquired sewing speed; and
deciding an error range stitch number, based on the acquired sewing complete stitch number and on the error range, using the sewing complete stitch number as a reference;
acquiring coordinates representing the formation positions of the sewing stitches corresponding to each of stitch numbers included in the decided error range stitch number; and
generating an error image obtained by drawing an occurrence position of the error on the sewing pattern, based on an image showing a shape of the sewing pattern and on the acquired coordinates using a coordinate range corresponding to the error range stitch number as the occurrence position of the error on the sewing pattern; and
an external device including a display portion displaying the image, the external device being configured to communicate with the sewing machine, and the external device including
a second processor; and
a second memory configured to store computer-readable instructions that, when executed by the second processor, instruct the second processor to perform processes comprising:

acquiring the generated error image, by the communication with the sewing machine; and displaying the acquired error image on the display portion.

8. The sewing error management system according to claim 7, wherein the deciding the error range includes correcting the error range by multiplying the error range by a correction coefficient that differs depending on a type of the error.

9. A sewing error management system comprising:

a sewing machine configured to sew a sewing pattern in accordance with coordinates representing formation positions of each of sewing stitches of the sewing pattern formed by a plurality of the sewing stitches, the sewing machine including a first processor, and a first memory configured to store computer-readable instructions that, when executed by the first processor, instruct the first processor to perform processes comprising:

acquiring the coordinates representing the formation position of the sewing stitch being sewn at a time point when each of a plurality of errors occurs in sewing of the sewing pattern;

generating a total error image obtained by drawing an occurrence position of each of the plurality of errors on the sewing pattern, based on an image showing a shape of the sewing pattern and the acquired coordinates; and an external device including a display portion displaying the image, the external device being configured to communicate with the sewing machine, and the external device including a second processor; and a second memory configured to store computer-readable instructions that, when executed by the second processor, instruct the second processor to perform processes comprising:

acquiring the generated total error image, by the communication with the sewing machine; and displaying the acquired total error image on the display portion.

10. The sewing error management system according to claim 9, wherein the acquiring the generated error image, by the communication with the sewing machine includes acquiring the total error image and a single error image, the single error image corresponding to one of the plurality of errors that occur in the sewing of the sewing pattern, and, in the single error image, the occurrence position of the one of the errors being drawn on the image showing the shape of the sewing pattern, and the displaying the acquired error image on the display portion includes switching between display of the total error image and the single error image on the display portion, based on switching command information.

11. The sewing error management system according to claim 9, wherein the computer-readable instructions stored in the second memory further instruct the second processor to perform a process comprising:

acquiring a type of error that actually occurs, of a plurality of errors that may occur in the sewing of the sewing pattern, and the displaying of the acquired error image on the display portion includes displaying the acquired type of error on the display portion.

12. The sewing error management system according to claim 9, wherein the computer-readable instructions stored in the second memory further instruct the second processor to perform a process comprising:

acquiring, for each of the plurality of errors, a countermeasure associated with a type of error that actually occurs, from among a plurality of the countermeasures respectively associated with a plurality of the types of errors that may occur in the sewing of the sewing pattern, the countermeasure being used to resolve each of the errors, and the displaying of the acquired error image on the display portion includes displaying the acquired countermeasure for each of the plurality of errors on the display portion.

13. A non-transitory computer-readable storage medium storing a sewing error management program for displaying error information relating to an error occurring in sewing of a sewing pattern formed from a plurality of sewing stitches on a display portion, the sewing error management program including computer-readable instructions that, when executed by a first processor provided in a sewing error management device, instruct the processor to perform processes comprising:

communicating with a sewing machine over a communication interface, the sewing machine being configured to sew the sewing pattern formed from the plurality of sewing stitches;

acquiring, for a plurality of errors that occur in the sewing of the sewing pattern, a total error image from the sewing machine over the communication interface;

the acquired total error image having been generated by a second processor in the sewing machine by:

acquiring coordinates representing a formation position of a sewing stitch being sewn at a time point when each of the plurality of errors occurs in the sewing of the sewing pattern;

generating an error image obtained by drawing an occurrence position of each of the plurality of errors on a sewing pattern, based on the acquired coordinates on an image showing a shape of the sewing pattern; and displaying the acquired total error image on the display portion.

* * * * *